United States Patent
Sumant et al.

(10) Patent No.: US 10,835,823 B2
(45) Date of Patent: Nov. 17, 2020

(54) SENSORY-BASED DYNAMIC GAME-STATE CONFIGURATION

(71) Applicant: Electronic Arts Inc., Redwood City, CA (US)

(72) Inventors: Chinmay Mukund Sumant, Sunnyvale, CA (US); Nitish Victor, Rochester, NY (US); Tushar Agarwal, San Carlos, CA (US); Preethi Ganeshan, San Carlos, CA (US); Sundeep Narravula, Saratoga, CA (US); Yu Jin, Fremont, CA (US); John Kolen, Foster City, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/234,149

(22) Filed: Dec. 27, 2018

(65) Prior Publication Data

US 2020/0206631 A1    Jul. 2, 2020

(51) Int. Cl.

| A63F 13/67 | (2014.01) |
| A63F 13/215 | (2014.01) |
| A63F 13/212 | (2014.01) |
| G06K 9/00 | (2006.01) |
| G10L 15/26 | (2006.01) |

(Continued)

(52) U.S. Cl.
CPC ............ *A63F 13/67* (2014.09); *A63F 13/212* (2014.09); *A63F 13/215* (2014.09); *G06K 9/00335* (2013.01); *G06N 20/00* (2019.01); *G10L 15/1815* (2013.01); *G10L 15/265* (2013.01); *G10L 25/63* (2013.01)

(58) Field of Classification Search
None
See application file for complete search history.

(56) References Cited

U.S. PATENT DOCUMENTS

| 8,751,527 B1 | 6/2014 | Riggio |
| 2012/0301108 A1 | 11/2012 | Zetterower |

(Continued)

FOREIGN PATENT DOCUMENTS

| JP | 2018-068618 | 5/2018 |
| KR | 10-1733458 | 5/2017 |

(Continued)

*Primary Examiner* — Jason T Yen
(74) *Attorney, Agent, or Firm* — Knobbe, Martens, Olson & Bear, LLP

(57) ABSTRACT

Systems presented herein may automatically and dynamically modify a video game being played by a user based at least in part on a determined or predicted emotional state of a user. Using one or more machine learning algorithms, a parameter function can be generated that uses sensory and/or biometric data obtained by monitoring a user playing a video game. Based on the sensory and/or biometric data, an emotional state of the user can be predicted. For example, it can be determined whether a user is likely to be bored, happy, or frightened while playing the video game. Based at least in part on the determination of the user's emotional state, the video game can be modified to improve positive feelings and reduce negative feelings occurring in response to the video game.

20 Claims, 10 Drawing Sheets

(51) Int. Cl.
*G10L 15/18* (2013.01)
*G10L 25/63* (2013.01)
*G06N 20/00* (2019.01)

(56) References Cited

U.S. PATENT DOCUMENTS

| | | | |
|---|---|---|---|
| 2014/0108445 A1 | 4/2014 | Oztekin | |
| 2014/0108842 A1* | 4/2014 | Frank | G06N 20/00 |
| | | | 713/323 |
| 2014/0324749 A1* | 10/2014 | Peters | G09B 7/04 |
| | | | 706/46 |
| 2016/0196505 A1* | 7/2016 | Katsuki | G06N 20/00 |
| | | | 706/12 |
| 2018/0150739 A1* | 5/2018 | Wu | G06F 40/211 |
| 2018/0366144 A1* | 12/2018 | Ashoori | G06N 20/00 |
| 2019/0046886 A1* | 2/2019 | George | A63F 13/212 |
| 2019/0355209 A1* | 11/2019 | Sorey | G07F 17/34 |
| 2020/0051582 A1 | 2/2020 | Gilson | |

FOREIGN PATENT DOCUMENTS

| | | |
|---|---|---|
| KR | 10-2017-0086427 | 7/2017 |
| KR | 10-2018-0062221 | 6/2018 |

\* cited by examiner

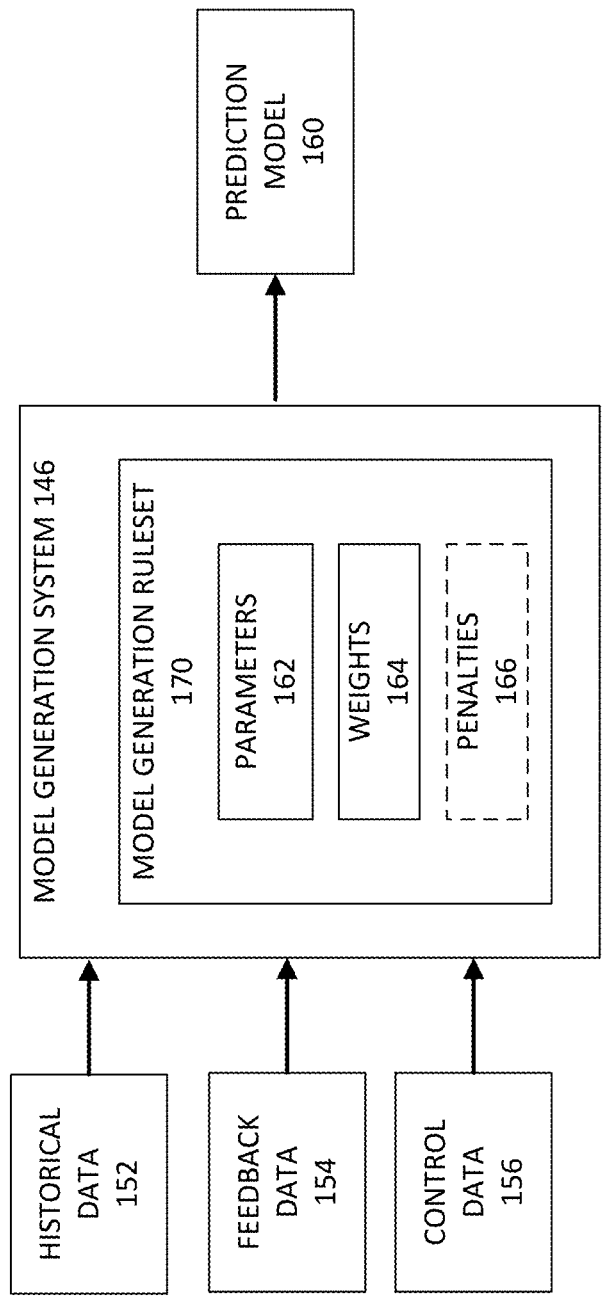

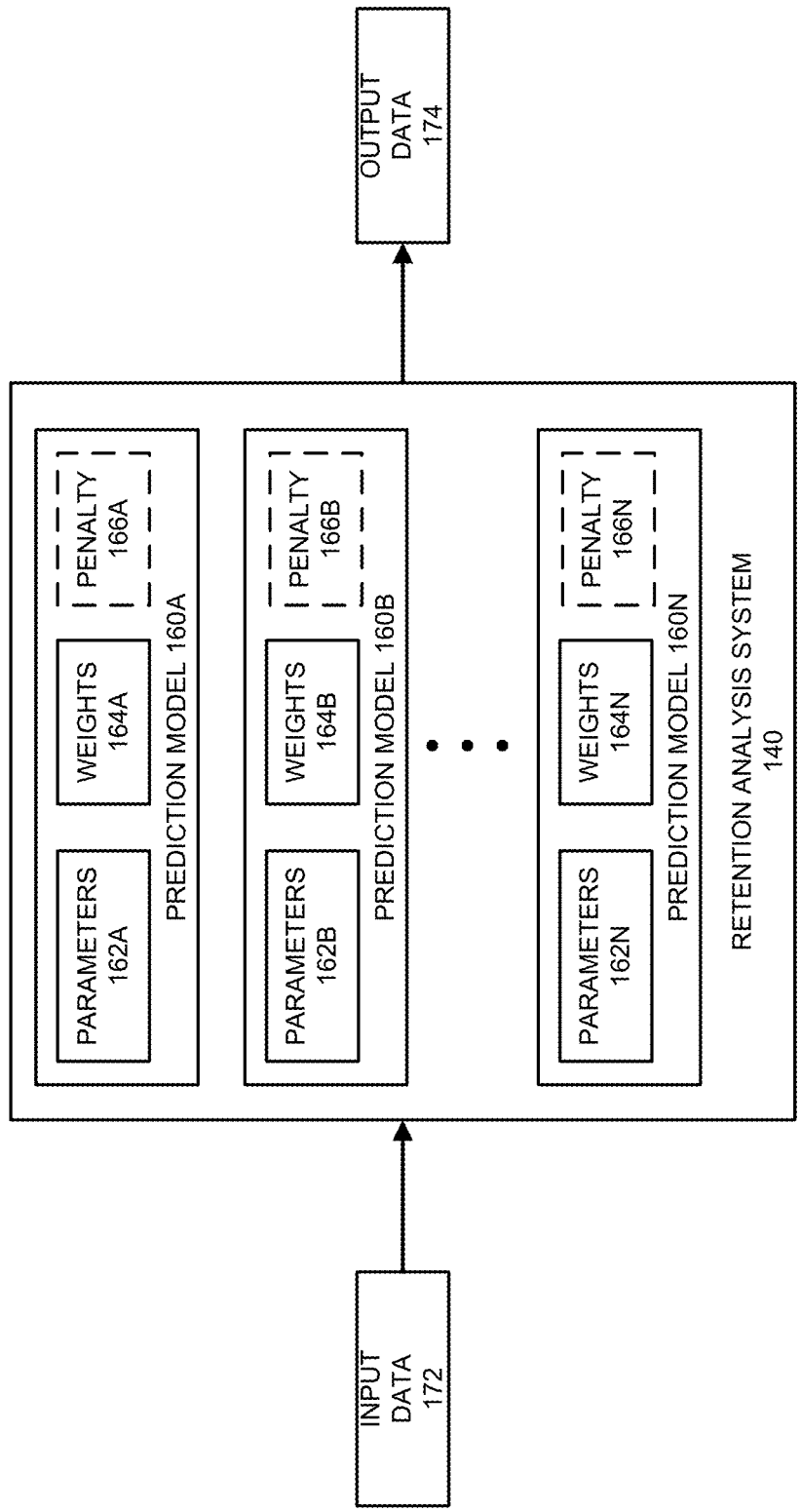

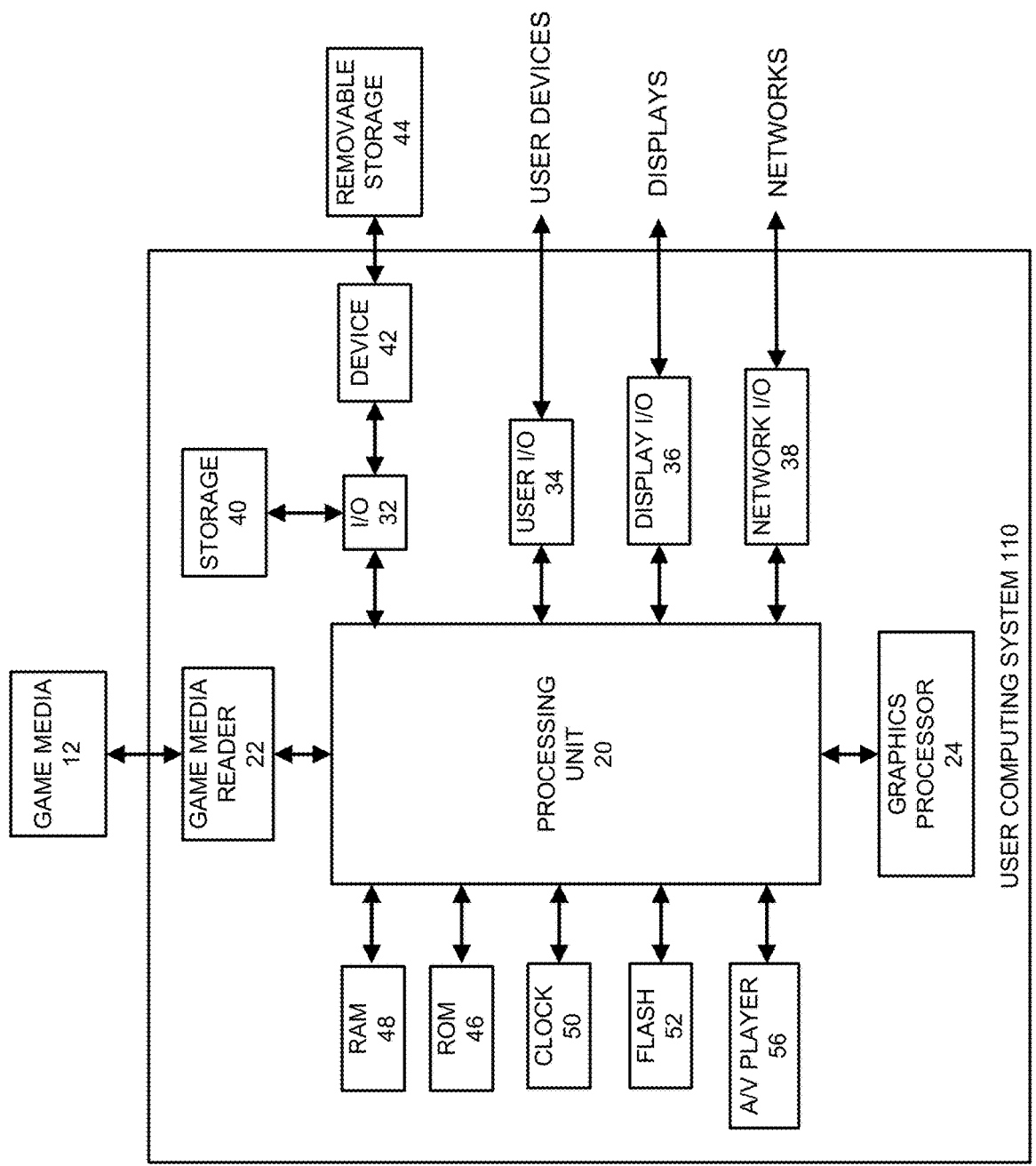

SENSORY-BASED DYNAMIC GAME-STATE CONFIGURATION

BACKGROUND

Software developers typically desire for their software to engage users for as long as possible. The longer a user is engaged with the software, the more likely that the software will be successful. The relationship between the length of engagement of the user and the success of the software is particularly true with respect to video games. The longer a user plays a particular video game, the more likely that the user enjoys the game and thus, the more likely the user will continue to play the game, or decide to play a sequel, expansion, or other video game (such as a mobile companion game or mobile edition of the game) relating to the particular video game.

Unsurprisingly, games that are unenjoyable to a user may result in low user-engagement. Moreover, as different users may react differently to a particular aspect or challenge of a video game, it is often not possible to make a video game that will appeal to all users. Thus, one of the challenges of game development is to design a game that will appeal to as many players as possible.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to a computer-implemented method that may be implemented by an interactive computing system comprising one or more processors and configured with specific computer-executable instructions. The computer-implemented method may comprise: receiving a set of sensory data from a user playing a video game; using a first prediction model, determining a predicted emotional state for the user based at least in part on the set of sensory data; based at least in part on the predicted emotional state for the user, determining a first modification to a state of the video game; and modifying the state of the video game based at least in part on the determined first modification to the state of the video game.

The method of the preceding paragraph can include any combination or sub-combination of the following features: where the set of sensory data comprises one or more types of sensory data; where the set of sensory data comprises biometric data; where the set of sensory data comprises at least one of audio data; visual data; heart rate data; respiratory rate data; or galvanic skin response data; where the method further comprises: receiving a set of signals corresponding to one or more sensors; and converting the set of signals to obtain the set of sensory data; where the method further comprises determining a predicted churn rate for the user by at least applying the predicted emotional state of the user to a second prediction model, wherein determining the first modification to the state of the video game comprises determining the first modification to the state of the video game based at least in part on the predicted churn rate; where determining the predicted emotional state comprises: providing the set of sensory data to a parameter function, the parameter function generated based at least in part on a machine learning algorithm; and determining the predicted emotional state based at least in part on an output of the parameter function; where the method further comprises generating the parameter function by at least: accessing a second set of sensory data, the second set of sensory data associated with a plurality of users who play the video game and corresponding to one or more emotional states; and using the machine learning algorithm to determine the parameter function based at least in part on the second set of sensory data and the corresponding one or more emotional states; where the sensory data includes audio data comprising speech and the method further comprises: converting the speech to text; determining a tone of the speech; and performing a semantic analysis of the speech, wherein determining the predicted emotional state for the user comprises providing the tone of the speech and a result of the semantic analysis of the speech to the first prediction model; where the sensory data comprises a plurality of types of sensory data, and wherein the first prediction model weights at least one type of sensory data differently than at least one other type of sensory data; where determining the first modification to the state of the video game comprises: determining a plurality of potential video game state modifications, each potential video game state modification associated with changing an emotional state of the user from a first emotional state to a second emotional state; determining a desired emotional state for the user; and selecting, from the plurality of potential video game state modifications, the first modification to the state of the video game that is associated with changing the emotional state of the user from the predicted emotional state to the desired emotional state; where subsequent to modifying the state of the video game, the method further comprises: receiving a second set of sensory data from the user playing the video game; using the first prediction model, determining a second predicted emotional state for the user based at least in part on the second set of sensory data; based at least in part on the second predicted emotional state for the user, determining a second modification to the state of the video game; and modifying the state of the video game based at least in part on the determined second modification to the state of the video game; where the second modification to the state of the video game reverts the state of the video game to a previous state of the video game when it is determined that the second predicted emotional state of the user is further from a desired emotional state than the predicted emotional state for the user; and where the second modification to the state of the video game is associated with a contrary modification to the state of the video game than the first modification of the state of the video game.

Additional aspects of the disclosure provide a system that comprises an electronic data store configured to store sensory data with respect to a video game; and a hardware processor in communication with the electronic data store. The hardware processor may be configured to execute specific computer-executable instructions to at least: receive a set of sensory data from a user playing the video game; use a first prediction model to determine a predicted emotional state for the user based at least in part on the set of sensory data; based at least in part on the predicted emotional state for the user, determine a first modification to a state of the video game; and modify the state of the video game based at least in part on the determined first modification to the state of the video game.

The system of the preceding paragraph can include any combination or sub-combination of the following features: where the hardware processor is further configured to determine the first modification to the state of the video game by determining a modified seed value for a portion of the video game, the modified seed value differing from an existing seed value previously determined to be applied to the portion of the video game, and wherein the hardware processor is further configured to modify the state of the video game by replacing the existing seed value with the modified seed value; where the hardware processor is further configured to determine a predicted churn rate for the user by at least applying the predicted emotional state of the user to a second prediction model, wherein determining the first modification to the state of the video game comprises determining the first modification to the state of the video game based at least in part on the predicted churn rate; where determining the predicted emotional state comprises: providing the set of sensory data to a parameter function, the parameter function generated based at least in part on a machine learning algorithm; and determining the predicted emotional state based at least in part on an output of the parameter function; where the hardware processor is further configured to generate the parameter function by at least: accessing a second set of sensory data, the second set of sensory data associated with a plurality of users who play the video game and corresponding to one or more emotional states; and using the machine learning algorithm to determine the parameter function based at least in part on the second set of sensory data and the corresponding one or more emotional states; and where the hardware processor is further configured to determine the first modification to the state of the video game by at least: determining a plurality of potential video game state modifications, each potential video game state modification associated with changing an emotional state of the user from a first emotional state to a second emotional state; determining a desired emotional state for the user; and selecting, from the plurality of potential video game state modifications, the first modification to the state of the video game that is associated with changing the emotional state of the user from the predicted emotional state to the desired emotional state.

Yet additional aspects of the disclosure provide a non-transitory computer-readable storage medium storing computer executable instructions that, when executed by one or more computing devices, configured the one or more computing devices to perform a set of operations corresponding to one or more of the embodiments disclosed herein.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 1C illustrates an embodiment of a model generation system of FIG. 1B.

FIG. 1D illustrates an embodiment of a retention analysis system of FIG. 1B.

FIG. 7 illustrates an embodiment of a hardware configuration for the user computing system of FIG. 6.

DETAILED DESCRIPTION OF EMBODIMENTS

Introduction

Figure 1A:
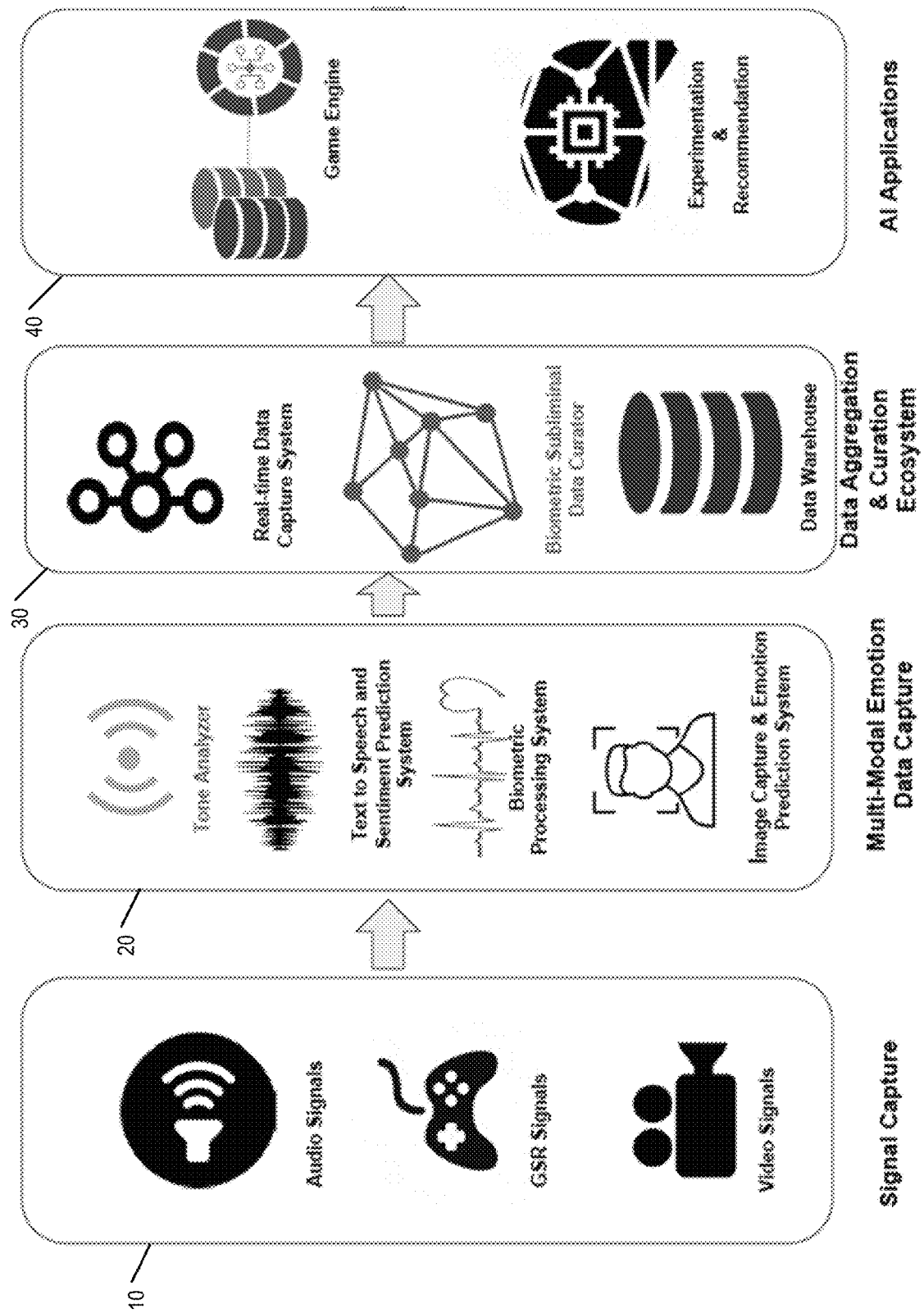
FIG. 1A illustrates a conceptual diagram of an embodiment of a sensory-based dynamic video game state modification system.

It is generally desirable for a video game to appeal to a large number of users. However, different users have different preferences for the types of video games they play. Moreover, different games elicit different moods or emotions from different users. In some cases, the different moods or emotions relate to the difficulty or challenge of the video game. For example, some users prefer video games that are relatively challenging and may develop positive emotions when playing a challenging game, even if the challenge results in a low success rate. Other uses may develop negative emotions when playing a challenging game, particularly when the challenge results in a low success rate. Users who develop positive emotions (such as happiness, a sense of accomplishment, excitement, and the like) tend to be more engaged by a video game than users who develop negative emotions (such as frustration, sadness, fear). Accordingly, it is often desirable to develop video games that elicit positive emotions in users. However, there may also be certain users who crave emotions that others user may consider negative. For example, while some users may not enjoy playing a video game that elicits fear or disgust, other users may enjoy a video game that elicits fear or disgust. Accordingly, a static video game designed to elicit particular emotions may appeal to less people than a video game that can be dynamically modified during runtime based on detected or predicted emotions from users.

Embodiments disclosed herein can detect or predict the emotion of a user playing a video game based on one or more sensory signals. The sensory signals, or data derived from the sensory signals, can be provided to a parameter function or a prediction model generated using a machine learning process. The parameter function can predict an emotion or mood of the user playing the video game. Based on the predicted mood of the user, the video game can be dynamically modified to adjust the mood of the user. By adjusting the mood users playing the video game, in certain embodiments, the retention rate or churn rate for the users can be modified.

Systems disclosed herein can modify the video game by changing different states or features of the video game. In some embodiments, the difficulty of the video game can be modified in an attempt to change the churn rate for the video game. Embodiments for changing the difficulty of the video game in an attempt to modify the churn rate for the video game are disclosed in U.S. Pat. No. 9,919,217, dated Mar. 20, 2018, and titled "DYNAMIC DIFFICULTY ADJUSTMENT," which is hereby incorporated by reference in its entirety herein.

Difficulty is not the only factor that can affect the mood, and consequently, the retention rate of users. In some embodiments, other features such as atmosphere, gore, profanity, and the like can affect the emotion or mood of the user. Moreover, emotions elicited by the game, such as fear, sadness, happiness, and the like can affect the retention rate of the users playing the video game. Embodiments disclosed herein can modify the state of the video game to modify features of the game or emotions elicited by the video game so as to improve satisfaction, and consequently, retention rate for users playing the video game.

FIG. 1A illustrates a conceptual diagram of an embodiment of a sensory-based dynamic video game state modification system according to certain embodiments described herein. A signal capture system 10 can be used to obtain sensory data associated with users playing the video game. The signal capture system can include sensors for capturing audio (such as microphones), optical sensors for capturing images or video (such as cameras), galvanic skin response (GSR) sensors for measuring a galvanic skin response (or electrodermal activity (EDA)) of a user, and any other types of sensors for capturing data that can be used to predict a user's emotional state.

The data or signals captured by the signal capture system 10 can be provided to an emotion capture system 20 that can use the data received from the signal capture system 10 to determine or predict an emotion of a user. The emotion capture system 20 can convert the signals into data that can be used to determine or predict the emotion of the user. For example, the emotion capture system 20 can convert audio to text, which may then be analyzed to determine the sentiment of the user. Further, the audio and text can be analyzed to determine its tone using a tone analyzer. The tone of the audio and text can be used by a parameter function, instead of or in addition to the sentiment, to determine an emotional state of the user. Other examples of sensory data that can be used to determine or predict emotions of users include visual data and biometric data. The visual data can include posture, stance, facial expressions, and the like. The biometric data can include heart rate, breath rate, skin or body temperature, and the like.

The captured signals obtained by the signal capture system 10 and/or the data obtained from the captured signals by the emotion capture system 20 can be aggregated and/or stored at a data aggregation and curation system 30. The data aggregation and curation system 30 can store the data in a data warehouse. This stored data can be used to facilitate testing of different versions of a video game. For example, A/B testing (for example testing of different versions of a video game among different user groups) can be performed and the emotional state data can be stored and compared to determine whether a first version (version A) or a second version (version B) of the video game results in more positive emotional states among users.

Based, at least in part, on the emotional state data received from the emotion capture system 20 and/or stored at the data warehouse of the data aggregation and curation system 30, a video game can be modified during play by a user by a set of one or more artificial intelligence or machine learning applications 40. Alternatively, or in addition, instances of a video game that are presented to different sets of user may be modified in advance by the machine learning applications 40 to facilitate testing different versions of a game engine. It should be understood that FIG. 1A represents one conceptual embodiment of a sensory-based dynamic video game state modification system. It is possible to implement other embodiments of the sensory-based dynamic video game state modification system that can determine an emotional state of a user and modify the configuration and/or state of a video game based on the emotional state of the user to obtain a different emotional state of the user. The modification of the emotional state of the user can be used to improve the probability of retaining the user as a player of the video game, or for retaining the user for a longer time period compared to a static version of the video game that cannot be modified based on an emotional state of the user.

To simplify discussion, the present disclosure is primarily described with respect to a video game. However, the present disclosure is not limited as such may be applied to other types of applications. For example, embodiments disclosed herein may be applied to educational applications or other applications that may be modified based on a history of user interactivity with the application. Further, the present disclosure is not limited with respect to the type of video game. The use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Example Networked Computing Environment

Figure 1B:
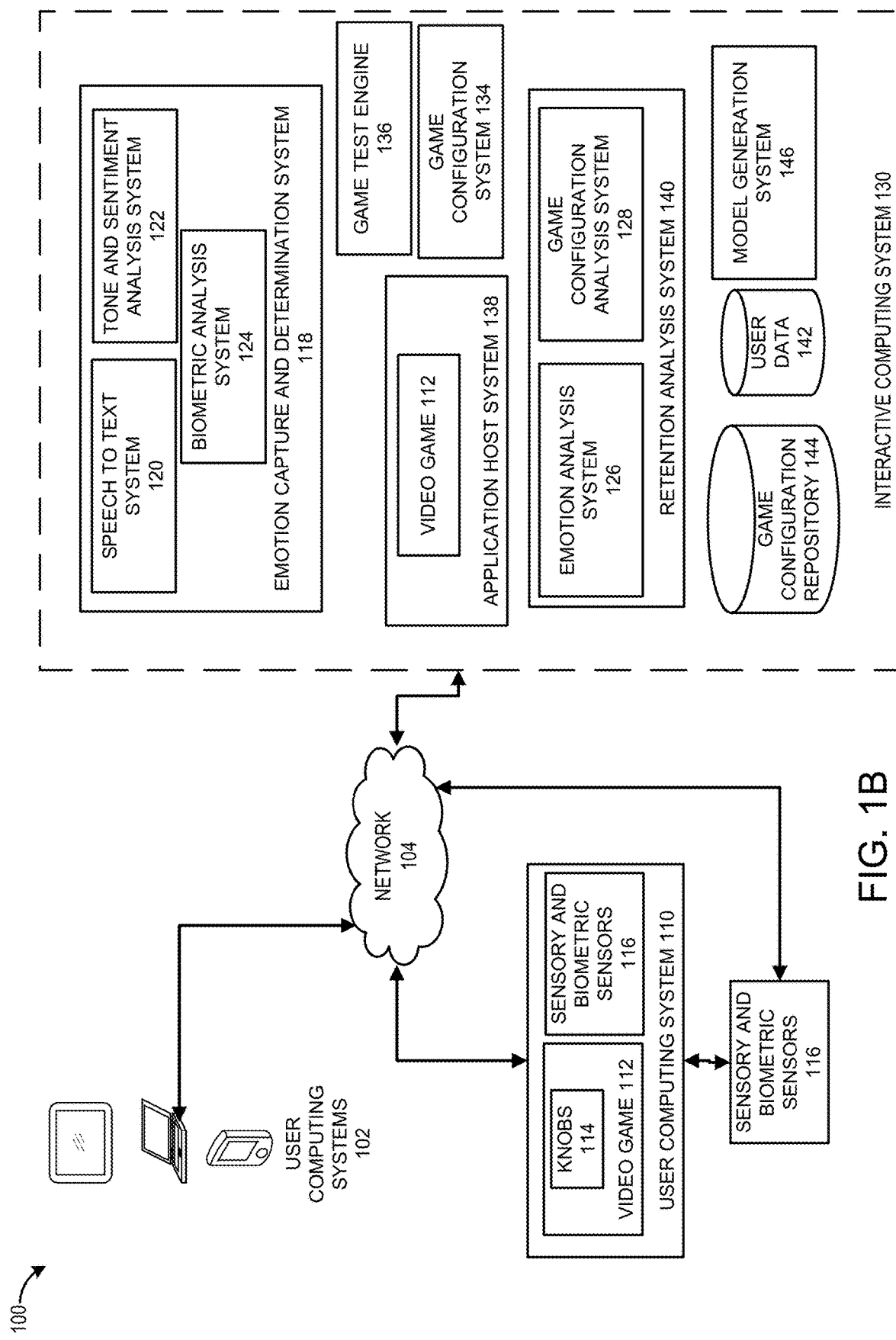
FIG. 1B illustrates an embodiment of a networked computing environment that can implement one or more embodiments of a sensory-based dynamic video game state configuration system.

FIG. 1B illustrates an embodiment of a networked computing environment 100 that can implement one or more embodiments of a sensory-based dynamic video game state configuration system. The networked computing environment 100 includes a user computing system 110 that can communicate with an interactive computing system 130 via a network 104. Further, the networked computing environment 100 may include a number of additional user computing systems 102. At least some of the user computing systems 102 may be configured the same as or similar to the user computing system 110.

User computing system 110 may include or host a video game 112. In some cases, the video game 112 may execute entirely on the user computing system 110. In other cases, the video game 112 may execute at least partially on the user computing system 110 and at least partially on the interactive computing system 130. In some cases, the video game 112 may execute entirely on the interactive computing system 130, but a user may interact with the video game 112 via the user computing system 110. For example, the game may be a massively multiplayer online role-playing game (MMORPG) that includes a client portion executed by the user computing system 110 and a server portion executed by one or more application host systems 138 that may be included as part of the interactive computing system 130. As another example, the video game 112 may be an adventure game played on the user computing system 110 without interacting with the interactive computing system 130.

The video game 112 may include a number of knobs 114 that modify or affect the state of the video game 112. Typically, the knobs 114 are variables that affect the execution or operation of the video game 112. In some cases, the knobs 114 are state variables that directly modify the execution of the video game 112. In other cases, the knobs 114 are seeds or seed variables that may alter the probability of an occurrence within the video game 112 or a random (or pseudorandom) configuration or event within the video game 112. For example, one seed may correspond to and may impact the generation of a level layout in the video game 112. As another example, one seed may correspond to and impact the number of occurrences of item drops or the types of items dropped as a user plays the video game 112. In some cases, the seed value is a value that initializes or influences a random or pseudorandom number generator. In some such cases, the random number generated based on the seed value may be utilized by one or more functions of the video game 112 to influence the operation of the video game 112. In some cases, the seed variables may be referred to as levers, and the seed variables are non-limiting examples of various types of knobs. It should be understood that the knobs 114, sometimes referred to as levers or state variables, are not limited to seeds, but can include any type of variable that may modify execution of the video game 112. The system may modify execution of the video game by adjusting any type of knob or lever that can change the video game 112 and may conduct a knob-level analysis of the churn rate or a knob-level analysis on the impact of values for the state variable on the emotion or predicted emotion of a user. The system is not limited to adjusting the knob or lever based on a seed value.

The knobs 114 may include variables that relate to a difficulty level of the video game 112. It should be understood that the knobs 114 typically include a subset of variables that modify the operation of video game 112 and that the video game 112 may include other variables not involved in the setting of the difficulty level of video game 112 and/or not available for modification. Further, the knobs 114 may include variables that modify the video game 112 in a manner that is not perceivable by a user or is difficult to perceive by the user. In some cases, whether or not the modification to the video game 112 is perceivable by the user may depend on the specific video game. For example, suppose that one knob 114 relates to the amount of life that an enemy in the video game 112 has. In some cases, modifying the value assigned to the knob 114 may be detectable by a user because, for example, the health of the enemy is numerically presented to the user. In such cases, the health of the enemy may remain unmodified in the difficulty level of video game 112, but the difficulty level of the video game 112 may be modified via a different knob 114. However, in some cases, modifying the health of the enemy may not be detectable by the user because, for example, the health of the enemy is not presented to the user and the amount of hits required to defeat the enemy varies within a range making it difficult for the user to determine that the health of the enemy may have been modified from one encounter with the enemy compared to another encounter with the enemy (for example, from one play through of the video game 112 compared to another play through of the video game 112).

Certain embodiments disclosed herein may attempt to modify a user's emotional state by changing the difficult of the video game 112. Alternatively, or in addition, certain embodiments disclosed herein may attempt to modify a user's emotional state by changing other features of the video game 112 by, for example, adjusting the game state, or knobs 114, of the video game 112 that may be unrelated or tangentially related to the difficulty of the video game 112. For example, if a user appears to be scared, or excessively scared as may be determined by sensory or biometric measurements of a user exceed a threshold, game state variables may be modified that contribute to the scariness of the video game 112. For instance, lighting in the game may be increased, noise made by monsters or enemies may be increased or detectable from a further distance within the video game, music may be modified to be less sinister, or enemies may appear further away from the user-playable character, and the like. As another example, if a user appears to be disgusted, shocked, or otherwise feeling displeased when playing a particularly gory game or a game with excessive foul language or rude humor, the game state may be modified to reduce the amount of blood or gore displayed, or the amount of foul language or rude humor may be reduced.

The user computing system 110 may further include a set of sensory and biometric sensors 116 that obtain sensory data from a user playing the video game 112. In some embodiments, the set of sensory and biometric sensors 116 generate sensory signals that are provided to the emotion capture and determination system 118 of the interactive computing system 130, which can convert the sensory signals to sensory data. This sensory data may be audio, visual, or galvanic skin response (GSR) data (sometimes referred to as Electrodermal activity (EDA) data). The set of sensory and biometric sensors 116 can include any type of system or sensor that can capture sensory data relating to a user. For example, the sensor may include microphones, image capturing systems (such as cameras), wearable devices, heart rate monitors; breath rate monitors, and the like. In some embodiments, the sensor may be a part of the user computing system 110, such as a camera or microphone. Alternatively, or in addition, the sensor may be an accessory for the user computing system 110, such as a gamepad that includes GSR sensors or a camera accessory.

In certain embodiments, as illustrated by the sensory and biometric sensors 116 external to the user computing system 110, the sensor may be separate from the user computing system 110. In some cases, the sensor may communicate with the user computing system 110. Alternatively, or in addition, the sensor may communication with the interactive computing system 130 via the network 104. For example, the sensor may be a wearable device, such as a fitness monitor, that can monitor the heart rate of a user. The wearable device may communicate with the user computing system 110 and/or with the interactive computing system 130.

The user computing system 110 may include hardware and software components for establishing communications over a communication network 104. For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIGS. 5 and 6.

As previously discussed, it may be desirable to maintain or increase a user's level of engagement with the video game 112. One solution for maintaining or increasing the user's level of engagement with the video game 112 includes configuring a state of the video game 112 based at least in part on a user's emotional state when playing the video game 112. The interactive computing system 130 can determine or predict a user's emotional state while playing the video game 112 and make changes to the video game 112 so as to maintain or modify the user's emotional state. This determination or prediction of the user's emotional state, as will be described in more detail below, may be made based at least in part on sensory and/or biometric information obtained for the user when playing the video game 112 and/or for other users playing the video game 112 using the same configuration and/or differing configuration. In some embodiments, the emotional state prediction may be based on sensory and/or biometric information obtained with response to other video games accessible by the user.

Interactive computing system 130 may include a number of systems or subsystems for facilitating the determination of a mood or emotional state for a user playing the video game 112 and for the modification of a state of the video game 112 based at least in part on the emotional state of the user playing the video game 112. These systems or subsystems can include a an emotion capture and determination system 118, a game configuration system 134, a game test engine 136, an application host system 138, a retention analysis system 140, and a model generation system 146. Further, the interactive computing system 130 may include one or more repositories for storing data used to facilitate performing the processes described herein. These repositories may include a user data repository 142 and a game configuration repository 144. It should be understood that the interactive computing system 130 may include more or fewer repositories for the optimal storage and management of data used with the processes described herein.

Each of the aforementioned systems of the interactive computing system 130 may be implemented in hardware, and software, or a combination of hardware and software. Further, each of the systems may be implemented in a single computing system comprising computer hardware or in one or more separate or distributed computing systems. Moreover, while the systems are shown in FIG. 1B to be stored or executed on the interactive computing system 130, it is recognized that in some embodiments, part or all of the systems can be stored and executed on the user computing system 110.

In some embodiments, when the user computing system 110 is connected or in communication with the interactive computing system 130 via the network 104, the interactive computing system 130 may perform the processes described herein. However, in some cases where the user computing system 110 and the interactive computing system 130 are not in communication, the user computing system 110 may perform certain processes described herein using recent emotional state information of the user that may be stored at the user computing system 110.

The emotion capture and determination system 118 may include any system that can use sensory signals and/or sensory data obtained from one or more sensory and biometric sensors 116 to determine or predict the emotion of a user playing the video game 112. In some embodiments, the emotion capture and determination system 118 may obtain and/or aggregate sensory data, and provide the sensory data to an emotion analysis system 126 of the retention analysis system 140 to determine or predict the emotional state of the user playing the video game 112.

In some embodiments, the emotion capture and determination system 118 may include a number of subsystems to facilitate obtaining or extracting sensory data from sensory signals received from the sensory and biometric sensors 116. Further, at least some of the number of subsystems may perform analysis of the sensory data and/or may aggregate or collate some of the sensory data. The result of the analysis and/or the aggregated sensory data may be provided to the emotion analysis system 126, which may determine or predict the emotional state of the user playing the video game 112 using, for example, one or more parameter or prediction functions generated using a machine learning process. The subsystems of the emotion capture and determination system 118 may include a speech to text system 120, a tone and sentiment analysis system 122, and/or a biometric analysis system 124.

The speech to text system 120 may include any system that can receive an audio signal and convert it to text. Further, the speech to text system 120 may identify audio signals associated with non-alphanumeric communication and convert the non-alphanumeric communication to representative text. For example, an audio signal associated with a moan or grunt could be converted to text indicating that the user moaned or grunted.

The tone and sentiment analysis system 122 may include any system that can determine a tone or sentiment of audio or visual data. For example, the tone and sentiment analysis system 122 may receive text from the speech to text system 120 and may determine based at least in part on the text the sentiment of the user's speech. As another example, the tone and sentiment analysis system 122 may process audio received from the sensory and biometric sensors 116 to determine a tone of the of the user's speech.

In addition to determining the tone and/or sentiment of speech or audio made by the user, the tone and sentiment analysis system 122 may determine a sentiment with respect to images and/or videos of the user captured by the sensory and biometric sensors 116. For example, an image or user of a user smiling or laughing may indicate a positive emotional state while playing the video game 112. In contrast, an image or video of a user frowning or giving a disgusted face may indicate a negative emotional state while playing the video game 112.

The biometric analysis system 124 can include any system that can determine physiological information of the user playing the video game 112 based at least in part on sensory data obtained from the sensory and biometric sensors 116. For example, the biometric analysis system 124 may determine a heart rate or a breath rate based at least in part on the sensory data. Alternatively, or in addition, in certain embodiments the physiological information may be received directly from the sensory and biometric sensors 116. For example, the sensory and biometric sensors 116 may provide a heart rate or breath rate of the user to the emotion capture and determination system 118. In some embodiments, the biometric analysis system 124 can determine additional emotional state information of the user based at least in part on audio or images obtained by the sensory and biometric sensors 116. For example, the biometric analysis system 124 may determine from received images that a user is sweating, which may consequently indicate a number of possible emotional states of the user, such as fear. In some cases, the predicted emotional state may be based at least in part on the particular video game 112 being played by the user. For example, determining that a user is sweating when playing a hard game indicate fear while determining the user is sweating when playing a fitness game may indicate intense involvement in the video game 112.

The retention analysis system 140 can include one or more systems for determining a predicted churn or retention rate for a user based on a determined or predicted emotional state of the user. In some embodiments, the sensory data determined by the emotion capture and determination system 118 from sensory signals received from the sensory and biometric sensors 116 are applied to a parameter or prediction model generated by the model generation system 146. Based on the application of the sensory data to the prediction model, the retention analysis system 140 can determine the predicted churn or retention rate for the user. Alternatively, or in addition, the sensory data is applied to a prediction or parameter model by the emotion analysis system 126 of the retention analysis system 140 to predict or determine an emotional state of the user. In some such embodiments, the predicted emotional state of the user may be applied to another parameter function by the retention analysis system 140 to determine a churn rate for the user.

In addition to the emotion analysis system 126, which can determine or predict an emotional state of a user using one or more parameter functions, the retention analysis system 140 may include a game configuration analysis system 128. The game configuration analysis system 128 may determine one or more knobs 114 or game state variables of the video game 112 the modified based at least in part on another parameter model. This additional parameter or prediction model may determine one or more aspects of a configuration or a state of the video game 112 to modify based on one or more of a predicted emotional state of the user or a predicted churn rate of the user please video game 112.

The game configuration system 134 sets or adjusts the state or configuration of a video game 112. In some embodiments, the game configuration system 134 modifies an existing configuration of the video game 112. Setting or modifying the configuration of the video game 112 may include modifying or changing one or more portions of the video game 112 by adjusting one or more knobs 114 or state variables of the video game 112. In some embodiments, the video game 112 is modified so as to adjust the difficulty level of video game 112. However, the present disclosure is not limited to modifying the difficulty level of a video game. Instead, embodiments of the present disclosure can be used to set or modify various different aspects of video game 112 that can affect a user's enjoyment of the video game 112 or the user's emotional state when playing the video game 112. For example, the game configuration system 134 can modify aspects of the video game 112 that changes the atmosphere of video game 112. For instance, the video game 112 can be modified to make it more or less bloody, more or less gory, more or less scary, more or less humorous, more or less serious, and the like. For example, the amount of lighting or the color of the shaders or textures can be modified to adjust the mood or atmosphere of the video game 112.

In certain embodiments, the game configuration system 134 may adjust the gameplay experience of playing the video game 112 by modifying the sequence of stages within the game, items that are dropped during the game, the difficulty level of the game, non-playable characters (NPCs) that are encountered during the game, and any other features of the video game 112 that can result in a different gameplay experience and consequently, in some cases, a different emotional state of the user. In some embodiments, the game configuration system 134 may adjust the video game 112 by modifying seed values that are used to generate portions of the video game 112 or other aspects of the video game 112, such as item drop rates or enemy appearances. The game configuration system 134 may adjust seed values instead of, or in addition to, directly modifying state variables or knobs 114 of the video game 112.

The model generation system 146 can use one or more machine learning algorithms to generate one or more prediction models or parameter functions. One or more of these prediction models may be used to determine an expected value or occurrence based on a set of inputs. For example, a prediction model can be used to determine an expected churn rate or a probability that a user will cease playing the video game 112 based on one or more inputs to the prediction model, such as, for example, historical user sensory data or an emotional state for a user playing the video game 112, similar video games, or other video games generally. As another example, a prediction model can be used to determine or predict an emotional state of a user based on one or more sensory data inputs to the prediction model. In some cases, the prediction model may be termed a prediction model because, for example, the output may be or may be related to a prediction of an action or event, such as the prediction the user continues to play the video game 112, or a prediction of a state, such as the emotional state of the user. A number of different types of algorithms may be used by the model generation system 146. For example, certain embodiments herein may use a logistical regression algorithm. However, other algorithms are possible, such as a linear regression algorithm, a discrete choice algorithm, or a generalized linear algorithm.

The machine learning algorithms can be configured to adaptively develop and update the models over time based on new input received by the model generation system 146. For example, the models can be regenerated on a periodic basis as new user information (for example, additional sensory data) is available to help keep the predictions in the model more accurate as the user information evolves over time. The model generation system 146 is described in more detail herein. After a model is generated, it can be provided to the retention analysis system 140.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

As previously described, the game configuration system 134 can modify one or more portions of the video game 112 based on an emotional state of the user playing the video game 112 in an attempt to modify the emotional state of the user. Adjusting the emotional state of the user may have been dynamically during a play session by the user. If it is determined that a change to the video game 112 is making a user's emotional state worse (for example, more negative), the game configuration system 134 can make a different change to the state of the video game 112.

In certain embodiments, the systems disclosed herein can be used to test or experiment on different versions of the video game 112 to determine their impact on the emotional state of different users. The game test engine 136 can include any system that can perform testing of the video game 112 to determine the impact on changes to the video game 112. While a game test engine 136 can often be used to detect the existence of bugs or errors in the development of the video game 112, embodiments disclosed herein enable the game test engine 136 to determine the impact of different configurations of portions of the video game 112 on the emotional state of users playing the video game 112. Thus, for example, the game test engine 136 may cause one version of the video game 112 to be presented to a first set of users, and another version of the video game 112 to be presented to a second set of users. The presentation of different versions of the video game 112 to different sets of users may be referred to as A/B testing. The motion capture and determination system 118 can obtain sensory data from the different sets of users. The sensory data can be used to determine the emotional state of the different sets of users. Based on the emotional state of the different sets of users, the game test engine 136 can determine a version of the video game 112 that is more likely to cause a greater number of users to be in a positive emotional state compared to other versions of the video game 112.

The game configuration repository 144 can include one or more mappings between the output of a prediction model and a configuration or state of the video game 112, which may be used by, for example, the game configuration system 134 to determine how to modify the video game 112 to adjust the emotional state, and consequently, churn rate of users of the video game 112. For example, if a user's predicted emotional state when playing an adventure game is "disgust," it may further be predicted that the level of churn is "high." In some such cases, the game configuration repository 144 may include a mapping between emotional state: disgust and/or churn rate: high, and data to adjust the video game 112 to have less elements that may cause disgust (for example, a lower level of gore). It should be understood that there is not always a one-to-one correspondence between aspects of a video game and emotional state. Often context may affect the emotional state of the user. For example, in the previous example, the video game was an adventure game and gore may result in more disgust for some users, while other users may not be affected by the presence of gore, or may have a more positive reaction to the realism the gore may introduce to the video game. If instead the game were a horror game, the presence of gore may result in a more positive emotional state as a user who is interested in playing a horror game may desire to see more gore. However, other users may prefer the suspense of a horror game and may react negatively to the presence of gore.

Further, generation and application of the parameter functions and their use in adjusting the state of the video game 112 will be described in further detail below with respect to the retention analysis system 140. In certain embodiments, one or more elements of the interactive computing system 130 may be combined or further separated among one or more computing systems.

The user data repository 142 can store sensory data associated with one or more users' interaction with the video game 112 and/or one or more other video games. This sensory data can be obtained over one or more play sessions of the video game 112. In some cases, at least some of the data stored in the user data repository 142 may be stored at a repository of the user computing system 110. Each of the repositories described herein may include non-volatile memory or a combination of volatile and nonvolatile memory.

As previously described, in some embodiments, the video game 112, or a portion thereof, may be hosted by an application host system 138 of the interactive computing system 130. For example, a MMORPG may have a portion executed or hosted on the user computing system 110 and a portion executed or hosted on an application host system 138 of the interactive computing system 130. In some such embodiments, the game configuration system 134 may modify the state of the video game 112 by modifying knobs, state variables, or features of the video game 112 hosted at the user computing system 110 and/or the application host system 138.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Model Generation System

FIG. 1C illustrates an embodiment of the model generation system 146 of FIG. 1B. The model generation system 146 may be used to determine one or more prediction models 160 based on historical data 152 for a number of users. Typically, although not necessarily, the historical data 152 includes data associated with a large number of users, such as hundreds, thousands, hundreds of thousands, or more users. However, the present disclosure is not limited as such, and the number of users may include any number of users. Further, the historical data 152 can include data received from one or more data sources, such as, for example, an application host system (not shown) and/or one or more user computing systems 102. Further, the historical data 152 can include data from different data sources, different data types, and any data generated by one or more sensory and biometric sensors 116 based on a user's interaction with the video game 112. In some embodiments, the historical data 152 may include a very large number of data points, such as millions of data points, which may be aggregated into one or more data sets. In some cases, the historical data 152 may be accessed from a user data repository 142. In some embodiments, the historical data 152 is limited to historical information about a particular video game 112, but in other embodiments, the historical data 152 may include information from one or more other video games. In some cases, the other video games are similar (for example, the same genre, the same theme, the same or similar types of objectives, and the like). In other cases, the video games that provide the historical data 152 are not limited in type or similarity. Further, in some embodiments, one or more subsets of the historical data may be limited by a date restriction, such as for example, limited to include only data from the last 6 months, data that is between 3-6 months old, or data less than a year old.

The model generation system 146 may, in some cases, also receive feedback data 154. This data may be received as part of a supervised model generation process that enables a user, such as an administrator, to provide additional input to the model generation system 146 that may be used to facilitate generation of the prediction model 160. For example, if an anomaly exists in the historical data 152, the user may tag the anomalous data enabling the model generation system 146 to handle the tagged data differently, such as by applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine a length of time that the users played the video game 112. If the amount of time each user played the game is known, this data may be provided as part of the control data 156, or as part of the historical data 152. As another example, if the prediction model is to be generated to estimate a retention rate as determined, for example, based on whether the users played the video game 112 for a threshold period of time or continue to play the video game 112 after a particular threshold period of time, the control data 156 may include the retention rate for the users whose data is included in the historical data 152. As yet another example, if the prediction model is to be generated to estimate a user's emotional state (for example, happy, sad, frustrated, disgusted, scared, and the like) based on the sensory data obtained for the user, the control data 156 may include an identification of emotional state for the users whose sensory data is included in the historical data 152. The identified emotional state used as control data may be self-reported and/or may be determined by other users, such as psychologists, who are trained in determining a user's emotional state.

The model generation system 146 may generally include a model generation rule set 170 for generation of the prediction model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, and defined output criteria, which may be included with the control data 156, used for training purposes. The model generation rule set 170 can define the specific machine learning rules and/or algorithms the model generation system 146 uses to generate the model based on a defined objective function, such as determining a churn rate or an emotional state of a user. In some embodiments, initial parameters 162 and weights 164 can be manually provided during the initiation of the model generation process. The parameters 162 and weights 164 can be updated and modified during the model generation phase to generate the prediction model 160.

The model generation system 146 can filter and categorize the historical data sets according to various characteristics and parameters of the data. For example, the data can be categorized by the data source (such as, for example, game application data, host application data, or user profile data), information type (such as, for example, gameplay information, transaction information, interaction information, game account information), or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

Optionally, one or more of the prediction models 160 may be associated with a penalty 166. These penalties 166 may be used to facilitate the generation of or selection of a particular prediction model 160 based on one or more factors that are used to derive the penalty. For example, the mathematical complexity or the number of parameters included in a particular prediction model 160 may be used to generate a penalty for the particular prediction model 160, which may impact the generation of the model and/or a selection algorithm or a selection probability that the particular prediction model 160 is selected.

After the prediction model 160 has been generated, the model can be used during runtime of the retention analysis system 140 or the emotion analysis system 126 to determine the emotional state of the user. Further, the prediction model 160, or another generated prediction model 160, may be used by the game configuration analysis system 128 to determine an adjustment to the state of the video game 112 to attempt to modify the emotional state of the user in a way that may improve the churn rate for the video game 112. In some cases, the adjustment of the difficulty may be dynamic and may occur during a user's interaction with the video game 112. Further, in some cases, the difficulty adjustment may occur in real-time or near real-time.

Example Retention Analysis System

FIG. 1D illustrates an embodiment of a retention analysis system 140 of FIG. 1B. The retention analysis system 140 can apply or use one or more of the prediction models 160 generated by the model generation system 146. Although illustrated as a separate system, in some cases, the retention analysis system 140 may be included as part of the game configuration system 134. The retention analysis system 140 may use one or more prediction models 160A, 160B, 160N (which may be referred to collectively as "prediction models 160" or in the singular as "prediction model 160") to process the input data 172 to obtain the output data 174. The prediction models 160 may also be referred to as parameter models.

The retention analysis system 140 may apply the prediction model(s) 160 during game play. In some embodiments, the prediction models 160 are applied continuously or repeatedly, but not necessarily continuously, to determine the type of effect generated by a change of video game state on the emotional state of a user playing the video game 112. In other embodiments, the prediction models 160 are applied at different times during the game and/or at different stages in the game. During determination of an emotional state of a user playing one or more portions of the video game 112, the retention analysis system 140 receives input data 172 that can be applied to one or more of the prediction models 160. The input data 172 can include one or more pieces of sensory data associated with a user who is playing the video game 112. This data may include sensory data obtained directly from the sensory and biometric sensors 116 and/or data extracted by the emotion capture and determination system 118 from sensory signals received from the sensory and biometric sensors 116. For example, the sensory data may include text derived from audio signal, the user's tone of speech as derived from the audio signals, a user's tone as determined from facial expressions or posture captured by image sensors, a sentiment of captured speech, and any other data that can be used to predict an emotional state of a user. In some embodiments, the input data 172 can be filtered before it is provided to the retention analysis system 140.

In some embodiments, a single prediction model 160 may exist for the retention analysis system 140. However, as illustrated, it is possible for the retention analysis system 140 to include multiple prediction models 160. For example, the retention analysis system 140 may include some prediction models for estimating a user's emotional state, some prediction models for estimate a churn rate of a user based on a user's emotional state, and some prediction models for determining changes to the video game 112 that will change a user's emotional state to a state that is estimated to improve retention rate for the video game 112. The retention analysis system 140 can determine which prediction model, such as any of models 160A-N, to use based on input data 172 and/or additional identifiers associated with the input data 172. Additionally, the selection of a prediction model 160 may be based on the specific input data 172 provided. The availability of particular types of data as part of the input data 172 can affect the selection of the prediction model 160. For example, the inclusion of demographic data (for example, age, gender, first language) as part of the input data may result in the use of prediction model 160A. However, if demographic data is not available for a particular user, then prediction model 160B may be used instead. As another example, the availability of audio data alone may result in the use of prediction model 160A, but the availability of audio and visual data or audio and heartrate data may result in the use of the prediction model 1608.

As mentioned above, one or more of the prediction models 160 may have been generated with or may be associated with a penalty 166. The penalty may be used to impact the generation of the model or the selection of a prediction model for use by the retention analysis system 140.

The output data 174 can be a retention rate or churn rate associated with a prediction that a user ceases to play the video game 112. For example, in some embodiments, the retention rate may be between 0 and 100 indicating the predicted percentage of users associated with similar or the same data as included as input data 172 who would cease to play the video game 112 within a threshold time period. In some cases, the output data 174 may also identify a reason for the retention rate. For example, the retention analysis system 140 may indicate that the 90% retention rate for a particular user is based at least in part on the amount of money spent while playing the video game 112. However, the retention analysis system 140 may indicate that the 90% retention rate for another user may be based at least in part on the below freezing temperature in the geographic region where the user is located. As another example, the retention analysis system 140 may indicate that the 20% retention rate for a user may be based at least in part on the below 25% win ratio.

In another example, the output data 174 may be a prediction emotional state of a user playing the video game 112. As with the retention rate, the output data may be on a scale between 0 and 100, with one end of the scale associated with a positive emotion and the other end of the scale associated with a negative emotion. In some embodiments, different prediction models 160 may be associated with different types of emotion or different aspects of emotion. The outputs of these prediction models can be combined, aggregated, or otherwise processed to determine a predicted emotion of a user. For example, happiness, fear, disgust, nervousness, and excitement (and other emotional attributes) may each be evaluated independently on a separate scale by a separate prediction model. The resultant output data 174 may be combined to determine an overall predicted emotional state of the user. The predicted overall emotional state may then be used to determine whether to modify the state of the video game, and how to modify the state of the video game (for example, to make the game more or less scary by adjusting light or music in the game).

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A). Optionally, one or more of the prediction models 160A, 160B, 160N may be associated with a penalty 166A, 1668, 166N, respectively (which may be referred to collectively as "penalties 166").

Example Machine Learning Process

Figure 2:
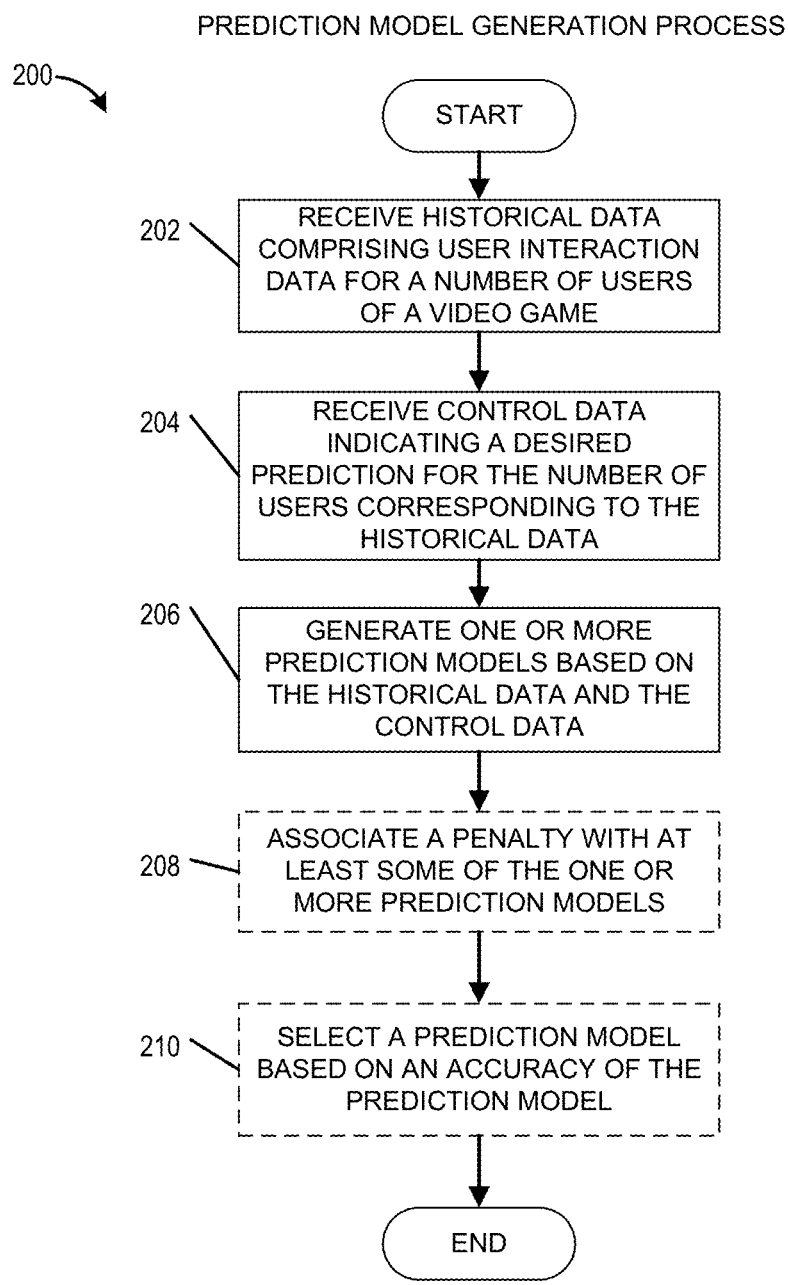
FIG. 2 presents a flowchart of an embodiment of a prediction model generation process.

FIG. 2 presents a flowchart of an embodiment of a machine learning process 200. The process 200 can be implemented by any system that can generate one or more parameter functions or prediction models that include one or more parameters. In some cases, the process 200 serves as a training process for developing one or more parameter functions or prediction models based on historical data or other known data. The process 200, in whole or in part, can be implemented by, for example, an interactive computing system 130, a game configuration system 134, a retention analysis system 140, a model generation system 146, or a user computing system 110, among others. Although any number of systems, in whole or in part, can implement the process 200, to simplify discussion, the process 200 will be described with respect to particular systems. Further, it should be understood that the process 200 may be updated or performed repeatedly over time. For example, the process 200 may be repeated once per month, with the addition or release of a new video game, or with the addition of a threshold number of new users available for analysis or who are playing a video game 112. However, the process 200 may be performed more or less frequently.

The process 200 begins at block 202 where the model generation system 146 receives historical data 152 comprising sensory data for a number of users of the video game 112. The sensory data may include any type of data that may be obtained from a sensor and that can be associated with a user emotion or emotional state, or that can be used to predict a user's emotional state. For example, the sensory data may include audio data (including speech and non-alphanumeric sounds, for example, grunts and moans), visual or image data (including still images and videos that may be used to determine facial expressions or posture), physiological data (for example, heart rate, breath rate, perspiration level, and the like), and any other data that may be used to determine or predict an emotional state of a user.

The historical data 152 may serve as training data for the model generation system 146 and may include, in addition to the sensory data, user demographics or characteristics, such as age, geographic location, gender, or socioeconomic class. In addition, the historical data 152 may include information relating to a play style of one or more users; the amount of money spent playing the video game 112; user success or failure information with respect to the video game 112 (for example, a user win ratio); a play frequency of playing the video game 112; a frequency of using particular optional game elements (for example, available boosts, level skips, in-game hints, power ups, and the like); the amount of real money (for example, U.S. dollars or European euros) spent purchasing in-game items for the video game 112; and the like. This additional historical data may be combined with or associated with the sensory data that may be used to determine a user's emotional state. Further, in some cases, the historical data 152 may include data related to the video game 112, such as one or more seed values used by users who played the video game 112. Additional examples of data related to the video game 112 that may be received as part of the historical data 152 may include settings for one or more knobs or state variables of the video game 112, the identity of one or more difficulty levels for the video game 112 used by the users, the type of the video game 112, and the like.

At block 204, the model generation system 146 receives control data 156 indicating a desired prediction for the number of users corresponding to the historical data. This control data 156 may indicate one or more features or characteristics for which the model generation system 146 is to determine a model. Alternatively, or in addition, the control data 156 may include a value for the features or characteristics that are associated with the received historical data 152.

For example, the control data 156 may identify an emotional state, a value associate with an emotional state (for example 0 for sad and 100 for happy), or a range of values associated with different emotions that may form an emotional state, as the desired feature to be predicted by the model that is to be generated by the model generation system 146. As another example, the control data 156 may identify churn rate, or retention rate, as the desired feature to be predicted by the model that is to be generated by the model generation system 146. The churn rate or retention rate may correspond to a percentage of users associated with the historical data 152 that ceased playing the video game 112. Further, the control data 156 may identify a retention rate associated with the historical data. For example, the control data 156 may indicate that the retention rate is 60% for certain of the users whose data is included in the historical data 152. In some embodiments, the control data 156 may include multiple characteristics or features to be predicted by the model to be generated by the model generation system 146. For example, the control data 156 may identify both a retention rate and a reason for the retention rate (such as the difficulty of the video game 112 being too low or too high for the users whose data was provided as part of the historical data 152 at block 202), or a retention rate and an average monetary amount spent by the users whose data was provided as the historical data 152.

At block 206, the model generation system 146 generates one or more prediction models 160 based on the historical data 152 and the control data 156. The prediction models 160 may include one or more variables or parameters 162 that can be combined using a mathematical algorithm or model generation ruleset 170 to generate a prediction model 160 based on the historical data 152 and, in some cases, the control data 156. Further, in certain embodiments, the block 206 may include applying one or more feedback data 154. For example, if the prediction model 160 is generated as part of a supervised machine learning process, a user (for example, an administrator) may provide one or more inputs to the model generation system 146 as the prediction model 160 is being generated and/or to refine the prediction model 160 generation process. For example, the user may be aware that a particular region or geographic area had a power outage. In such a case, the user may supply feedback data 154 to reduce the weight of a portion of the historical data 152 that may correspond to users from the affected geographic region during the power outage. Further, in some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160. In some cases, certain types of data may be considered more valuable than other types of data and may therefore be weighted more heavily. For example, audio data may be weighted more heavily than a physiological parameter related to perspiration. In cases where data is missing (for example because a user does not have a camera), the corresponding variable may be weighted less or eliminated.

Optionally, at block 208, the model generation system 146 applies a penalty 166 to or associates a penalty 166 with at least some of the one or more prediction models 160 generated at block 206. The penalty associated with each of the one or more prediction models 160 may differ. Further, the penalty for each of the prediction models 160 may be based at least in part on the model type of the prediction model 160 and/or the mathematical algorithm used to combine the parameters 162 of the prediction model 160, and the number of parameters included in the parameter function. For example, when generating a prediction model 160, a penalty may be applied that disfavors a very large number of variables or a greater amount of processing power to apply the model. As another example, a prediction model 160 that uses more parameters or variables than another prediction model may be associated with a greater penalty 166 than the prediction model that uses fewer variables. As a further example, a prediction model that uses a model type or a mathematical algorithm that requires a greater amount of processing power to calculate than another prediction model may be associated with a greater penalty than the prediction model that uses a model type or a mathematical algorithm that requires a lower amount of processing power to calculate.

The model generation system 146, at block 210, based at least in part on an accuracy of the prediction model 160 and any associated penalty, selects a prediction model 160. In some embodiments, the model generation system 146 selects a prediction model 160 associated with a lower penalty compared to another prediction model 160. However, in some embodiments, the model generation system 146 may select a prediction model associated with a higher penalty if, for example, the output of the prediction model 160 is a threshold degree more accurate than the prediction model associated with the lower penalty. In certain embodiments, the block 210 may be optional or omitted. For example, in some cases, the prediction models 160 may not be associated with a penalty. In some such cases, a prediction model may be selected from a plurality of prediction models based on the accuracy of the output generated by the prediction model.

Example Video Game State Modification Process

Figure 3:
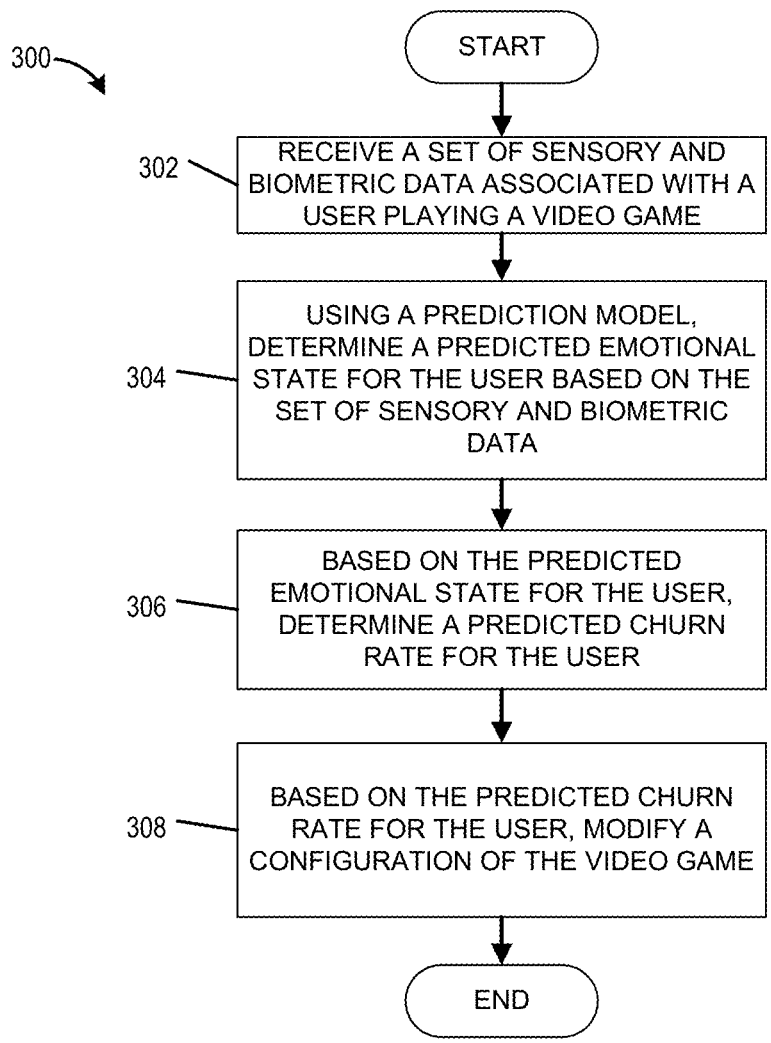
FIG. 3 presents a flowchart of an embodiment of a video game state modification process based at least in part on churn rate.

FIG. 3 presents a flowchart of an embodiment of a video game state modification process 300 based at least in part on churn rate. The process 300 can be implemented by any system that can modify a video game state or the configuration of a video game 112 to improve the churn rate or retention rate for the video game 112 based on a predicted emotional state of a user playing the video game 112. The process 300, in whole or in part, can be implemented by, for example, an interactive computing system 130, an emotion capture and determination system 118, a game configuration system 134, a model generation system 146, a retention analysis system 140, or a user computing system 110, among others. Although any number of systems, in whole or in part, can implement the process 300, to simplify discussion, the process 300 will be described with respect to particular systems. Further, it should be understood that the process 300 may be updated or performed repeatedly over time. For example, the process 300 may be repeated for each play session of a video game 112, for each round of the video game 112, each week, each month, for every threshold number of play sessions, for every threshold number of times a user loses or fails to complete an objective, each time a win ratio drops below a threshold level, and the like. However, the process 300 may be performed more or less frequently. It should also be understood that the process 300 may be performed in real-time, or substantially close to real-time, enabling the video game 112 to be modified while the user is playing the video game 112. Thus, the process 300 can make for a dynamic gaming experience. Alternatively, the process 300 may be performed after one or more play sessions so that the video game 112 is modified for a subsequent play session.

The process 300 begins at block 302 where the emotion capture and determination system 118 receives a set of sensory and biometric data associated with a user playing a video game 112. The set of sensory and biometric data may be received from a set of sensory and biometric sensors 116. Alternatively, or in addition, the emotion capture and determination system 118 receives a set of sensory signals from the sensory and biometric sensors 116. In some such embodiments, the emotion capture and determination system 118 may convert the sensory signals or otherwise extract data from the sensory signals. For example, the emotion capture and determination system 118 may convert audio signals to text using the speech to text system 120. The resultant text can be analyzed to determine a tone or sentiment of the text using the tone and sentiment analysis system 122. In some embodiments, the set of sensory and biometric sensors 116 includes a single sensor, such as an audio sensor (for example a microphone) or an image sensor. In other embodiments, the set of sensory and biometric sensors 116 includes multiple sensors, such as audio sensors, video sensors, physiological sensors, and the like. These physiological sensors may include fitness monitors, galvanic skin response sensors, and/or other wearable devices. In some cases, at least some of the sensors 116 may be included as part of a game controller, a virtual reality or augmented reality system, or as part of any other user interface device that may be used to play the video game 112.

At block 304, the emotion analysis system 126 of the retention analysis system 140 uses a prediction model to determine a predicted emotional state for the user based at least in part on the set of sensory and biometric data received or otherwise obtained at the block 302. The set of sensory and biometric data may serve as the input data 172 to the prediction model 160. In certain embodiments, the block 304 may include the emotion capture and determination system 118 determining a tone and/or sentiment for sensory data (for example speech) received at the block 302. Further, the block 304 may include aggregating and/or otherwise creating a composite of the sentiment determined from the sensory data received at the block 302. The determined sentiment and/or tone data may be provided to the emotion analysis system 126 to facilitate determining the predicted emotional state of the user. For example, the sentiment and/or tone data may be supplied as a parameter to the prediction function.

At block 306, based at least in part on the predicted emotional state for the user, the retention analysis system 140 determines a predicted churn rate for the user. In certain embodiments, the retention analysis system 140 uses a prediction model to determine the predicted churn rate for the user. This prediction model may use the predicted emotional state as the input data 172, released as part of the input data 172, to the prediction model. The prediction model used at the block 306 generally differs from the prediction model used at the block 304. However, in certain embodiments the prediction model of the block 306 is the same prediction model used at the block 304. In some such embodiments, the predicted churn rate may be determined based at least in part on the set of sensory and biometric data supplied to the prediction model as the input data 172. Further, in some embodiments, the predicted emotional state may serve as feedback data or as a weight used in solving the prediction model to determine the churn rate.

In some embodiments, the predicted churn rate is determined based at least in part on mappings between predicted emotional states and churn or retention rates. These mappings may be determined based on an analysis of historic data obtained from monitoring the emotional states of sets of users. The sets of users may be test users or real users who are monitored over time. In some embodiments, the historic data is analyzed using one or more machine learning models to determine a mapping between the predicted emotional states in the churn or retention rates. In an embodiment where the predicted churn rate is determined based at least in part on the mappings between the predicted emotional states and the trainer retention rates, the retention analysis system 140 may access a repository, such as the user data depository 142, to determine a predicted churn rate for the user based on the predicted emotional state of the user as determined at the block 304. In some embodiments, the predicted emotional state may be used as an index to access the user data repository 142 for determining a corresponding predicted churn rate. For example, one or more generally negative predicted emotional states, such as a feeling of fear, boredom, or disgust (for example, due to excessive blood or gore), may be associated with a high churn rate or a low retention rate. On the other hand, one or more generally positive predicted emotional states, such as a feeling of excitement, joy, or wonder, may be associated with a low churn rate or a high retention rate. In some embodiments, different video games may have different emotional states associated with different churn or retention rates. Moreover, in some cases, a generally negative predicted emotional state may be neutral or even positive for particular video games. For example, an emotional state associated with fear may be considered positive for a video game with a horror theme.

In certain embodiments, the block 306 may be optional or omitted. For example, the predicted emotional state may serve as a substitute for Turner retention rate. For instance, a developer may consider particular predicted emotional states as a negative and may automatically assume that such emotional states will result in excessive churn. In some such cases, a separate process for determining a churn rate may be omitted from the process 300.

At block 308, based at least in part on the predicted churn rate for the user, the game configuration system 134 modifies a configuration of the video game 112. In some embodiments, the game configuration system 134 may access a game configuration repository 144 to determine one or more changes to the state of the video game 112 or the configuration of the video game 112 to make based on the predicted churn rate for the user. Alternatively, or in addition, the game configuration system 134 may determine the changes to make to the video game 112 based at least in part on the predicted emotional state for the user.

Modifying a state or configuration of the video game 112 may include modifying one or more state variables and/or game settings for the video game 112. The changes to the state variables and/or game settings may result in changes to one or more aspects of the video game 112 and can include any aspect of the video game 112. For example, some non-limiting changes to the video game 112 may relate to difficulty, the amount of blood or gore, the music, the sound effects, the volume level of music or sound effects, the lighting, textures or shaders used, particular game events, levels made available to the user, an order or sequence of stages or levels, numbers or types of enemies or opponents, numbers or types of non-playable characters, in-game items dropped or made available, game options or expansions presented to the user, or any other factor related to the video game 112 that can have an impact on the user's emotional state when playing or interacting with the video game 112.

In some embodiments, instead of or in addition to changing particular values of the state variables or game settings, the game configuration system 134 may modify seed values used by the video game 112. The seed values may affect one or more randomly generated events occurring in the video game 112 or one or more characteristics of characters or events occurring in the video game 112. For example, a change in seed values may affect types or amounts of items provided to a user who defeats an enemy or completes an objective, the difficulty of opponents in the video game 112, or the quests presented to the user playing the video game 112.

In certain embodiments, the determination of changes to make to the video game 112 may be based at least in part on a prediction model. For example, the game configuration analysis system 128 may supply as input to a prediction model the predicted emotional state of the user, the churn or retention rate for the user, and/or one or more characteristics of the video game 112 (for example, theme of the video game or intended audience of the video game) and the prediction model may determine suggested changes to make to the video game 112 to improve or make more positive the predicted emotional state of the user and/or to improve the churn or retention rate for the user.

In certain embodiments where the predicted emotional state is positive or is associated with an above threshold degree of positivity or where the churn or retention rate satisfies a threshold, the game configuration system 134 may make no changes to the video game 112. Similarly, in certain embodiments where the predicted emotional state and/or the predicted churn or retention rate cannot be determined or cannot be determined with a threshold degree of confidence, again configuration system 134 may make no changes to the video game 112. Whether or not a predicted emotional state is considered positive or negative may be based at least in part on a classification of the emotional state by a developer, a result of applying machine learning algorithm to historical data to determine an impact of the emotional state on retention rate, the type of video game 112, or any other factor that may affect whether an emotional state is considered positive or negative.

Second Example Video Game State Modification Process

Figure 4:
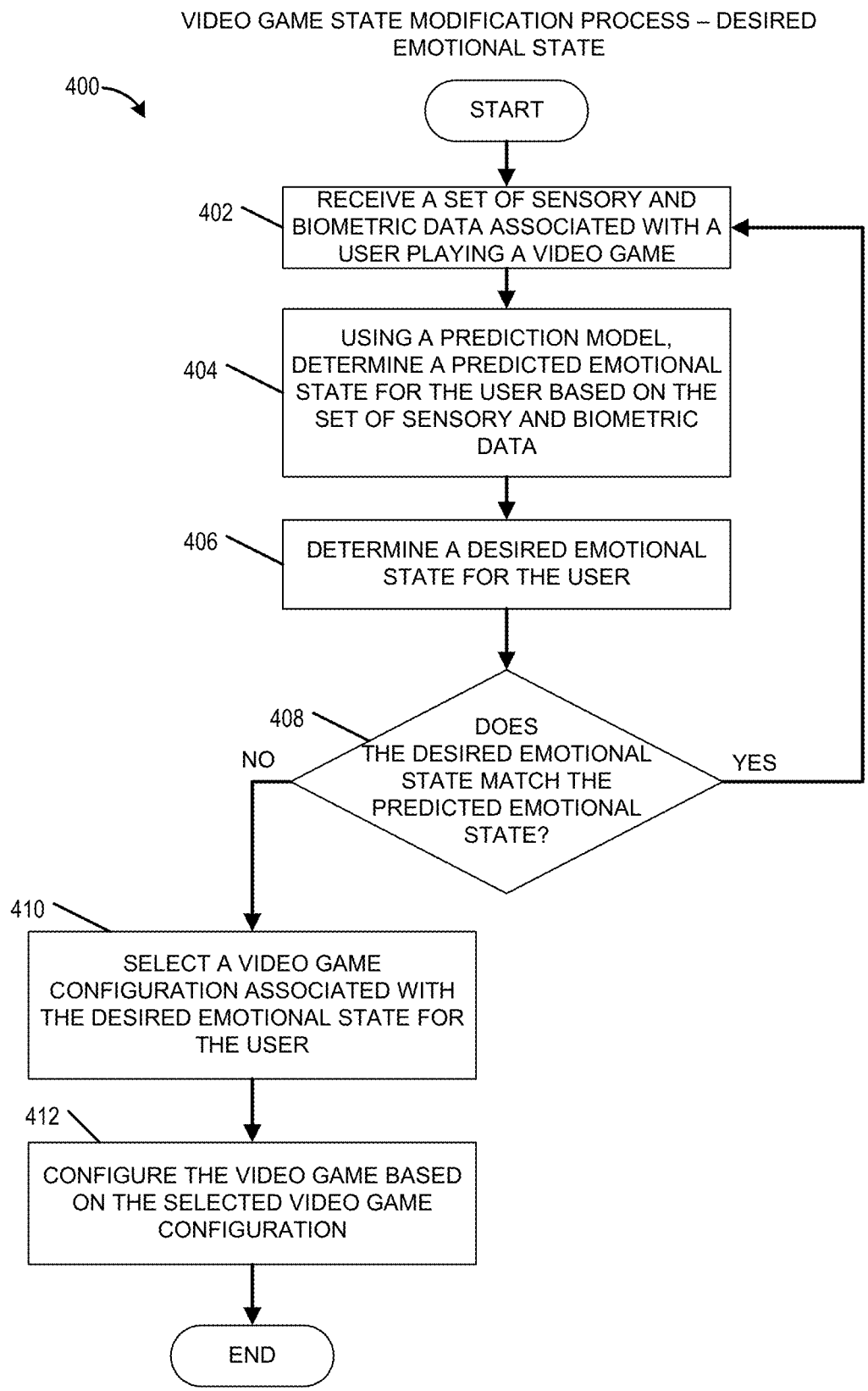
FIG. 4 presents a flowchart of an embodiment of a video game state modification process based at least in part on a desired emotional state.

FIG. 4 presents a flowchart of an embodiment of a video game state modification process based at least in part on a desired emotional state. The process 400 can be implemented by any system that can modify a video game state or the configuration of a video game 112 based at least in part on a desired emotional state of a user playing the video game 112. The process 400, in whole or in part, can be implemented by, for example, an interactive computing system 130, an emotion capture and determination system 118, a game configuration system 134, a model generation system 146, a retention analysis system 140, or a user computing system 110, among others. Although any number of systems, in whole or in part, can implement the process 400, to simplify discussion, the process 400 will be described with respect to particular systems. Further, it should be understood that the process 400 may be updated or performed repeatedly over time. For example, the process 400 may be repeated for each play session of a video game 112, for each round of the video game 112, each week, each month, for every threshold number of play sessions, for every threshold number of times a user loses or fails to complete an objective, each time a win ratio drops below a threshold level, and the like. However, the process 400 may be performed more or less frequently. It should also be understood that the process 400 may be performed in real-time, or substantially close to real-time, enabling the video game 112 to be modified while the user is playing the video game 112. Thus, the process 400 can make for a dynamic gaming experience. Alternatively, the process 400 may be performed after one or more play sessions so that the video game 112 is modified for a subsequent play session.

The process 400 begins at block 402 where the emotion capture and determination system 118 receives a set of sensory and biometric data associated with a user playing a video game 112. In certain embodiments, the block 402 may include one or more of the embodiments previously described with respect to the block 302.

At block 404, the emotion analysis system 126 of the retention analysis system 140 uses a prediction model to determine a predicted emotional state for the user based at least in part on the set of sensory and biometric data received or otherwise obtained at the block 402. In certain embodiments, the block 404 may include one or more of the embodiments previously described with respect to the block 304.

At block 406, the retention analysis system 140 determines a desired emotional state for the user playing the video game 112. The desired emotional state may be determined based at least in part on a churn rate associated with the predicted emotional state of the user. Further, the desired emotional state for the user may be determined based at least in part on the type of video game. For example, a horror game is expected to be scary to at least some degree and thus, a desired emotional state may include some degree of fear. In some cases, the degree of fear desired may be based on whether the target audiences for children or adults and/or how scary the developers desire the video game to be. However, a lighthearted adventure game, particularly one with a younger target audience, is not expected to be scary and thus, a desired emotional state may not include fear of any level. In some embodiments, determining the desired emotional state may include supplying characteristics of the video game and/or characteristics of the target audience to a parameter or production function. Alternatively, or in addition, a developer or publisher of the video game 112 may specify the desired emotional state.

At decision block 408, the retention analysis system 140 determines whether the desired emotional state matches the predicted emotional state. Determining whether the desired emotional state matches the predicted emotional state may include determining whether the predicted emotional state matches within a threshold degree to the desired emotional state. Further, determining whether the predicted emotional state matches the desired emotional state may include converting the predicted emotional state and the desired emotional state to numeric values and comparing the numeric values. For example, if the desired emotional state is happiness, the desired emotional state and the predicted emotional state may each be converted to a numeric value on a scale where one end of the scale is associated with a particular degree of happiness and the opposite end of the scale is associated with a different degree of happiness or is associated with a degree of unhappiness. The retention analysis system 140 may compare the values associated with the emotional states to determine whether the predicted amount of happiness matches the desired amount of happiness. In certain embodiments, the predicted emotional state may be more complex than a single emotion. Accordingly, in certain embodiments, the predicted emotional state may be associated with a plurality of values with each value associated with a different aspect of the predicted emotional state of the user. These values may be compared separately to corresponding values of the desired emotional state. Alternatively, or in addition, the values may be aggregated or otherwise combined to obtain a composite value that can be compared to a corresponding value of the desired emotional state.

If it is determined that the desired emotional state matches the predicted emotional state, the process 400 may return to the block 402. The operations associated with the block 402 may then be repeated on a continuous basis, at set intervals, when a user reaches a particular objective in the video game, after a certain event or number of events occur with respect to the video game 112, or any other trigger that may cause the operations associated with block 402 to repeat.

If it is determined that the decision block 408 that the desired emotional state does not match the predicted emotional state, the process 400 proceeds to the block 410. At block 410, the game configuration system 134 selects a video game configuration associated with the desired emotional state for the user. In certain embodiments, the game configuration system 134 may select the video game configuration associated with the desired emotional state by accessing a set of game configurations stored or otherwise identified at the game configuration repository 144. For example, suppose that the video game 112 is a horror game with an intended audience of adults, and further suppose that the predicted emotional state of the user indicates that the user is not scared. In this example, it may be desirable to make the video game 112 scarier to improve the chance that the user continues to play the video game. To make the video game 112 scarier, the game configuration system 134 and access the game configuration repository 144 to determine settings associated with providing a scarier experience when playing the video game 112. The settings may include playing eerier music, reducing the lighting in the game, having monsters wait until the in-game playable character is closer to them before jumping out, and/or having monster appear in unexpected places. Advantageously, by dynamically adjusting the fear factor, or how scary the video game 112 is, the retention of users who enjoy scary games may be increased. Similarly, by dynamically reducing how scary a video game 112 is, the retention of users who enjoy action games, but not being scared, may be increased. Accordingly, in certain embodiments, the overall retention of the video game 112 may be increased by dynamically adjusting one or more features of the video game 112 based at least in part on the emotional state of the particular user playing the video game 112. In certain embodiments, the block 410 may include one or more of the embodiments described with respect to the block 308.

At block 412, the game configuration system 134 configures the video game 112 based at least in part on the selected video game configuration. In certain embodiments, the game configuration system 134 configures the video game 112 dynamically or substantially in real time. In other words, in certain embodiments, the game configuration system 134 may modify one or more aspects of the video game 112 as the user is playing the video game 112. Alternatively, or in addition, the game configuration system 134 may modify one or more aspects of the video game 112 in advance of a subsequent play session of the video game 112 based at least in part on determinations majoring a current play session the video game 112. For instance, if it is determined during a current play session of the video game 112 that a particular level of the video game 112 was too difficult or too scary, the game configuration system 134 may modify the video game 112 such that the next time the user plays the video game 112 the particular level is less difficult or less scary. While in certain embodiments the game configuration system 134 makes changes to the video game 112 for a particular user playing the video game 112 based on analysis of the predicted emotional states of the particular user, and certain other embodiments game configuration system 134 may make changes to the video game 112 for other users based on the predicted emotional state of the particular user. In certain embodiments, the block 412 may include one or more of the embodiments described with respect to the block 308.

In certain embodiments, operations of the processes 300 and 400 may be based at least in part on sensory data obtained from multiple users. For example, in some cases, a user may play video game 112 with other users in the room who may or may not be playing the video game 112 with the user. In some such cases, the sensory and/or biometric data obtained at the block 302 or 402 may be associated with multiple users. In some cases, the emotion capture and determination system 118 may filter out sensory and/or biometric data associated with users who are not playing the video game. For example, if the video game 112 is a single player video game, the emotion capture and determination system 118 may filter out sensory and/or biometric data of non-player users. Emotion capture and determination system 118 may identify the sensory and/or biometric data that is associated with non-player users based at least in part on the sensory data. For example, based on images captured by the sensory and biometric sensors 116, the emotion capture and determination system 118 may determine users in a room that are not playing the video game 112 and may filter out any biometric data obtained from such users.

In some embodiments, a user may play the video game 112 with other users who are in the room or who are elsewhere in the case of network-based multiplayer. In some such embodiments, the processes 300 and/or 400 may determine an aggregate predicted emotional state for the users playing the video game 112. The determination of whether or not to modify the video game 112 may be based at least in part on the aggregate predicted emotional state for the users. Alternatively, or in addition, the determination of whether or not to modify the video game 112 may be based on a majority of the users playing the video game 112. For example, if it is determined that four of six players playing the video game 112 are associated with a negative emotional state, the game configuration system 134 may modify a state or configuration of the video game 112. If on the other hand it is determined, for example, that only one of the six players is associated with a negative emotional state, the game configuration system 134 may determine to not make any changes to the video game 112.

Example Game Configuration Evaluation Process

Figure 5:
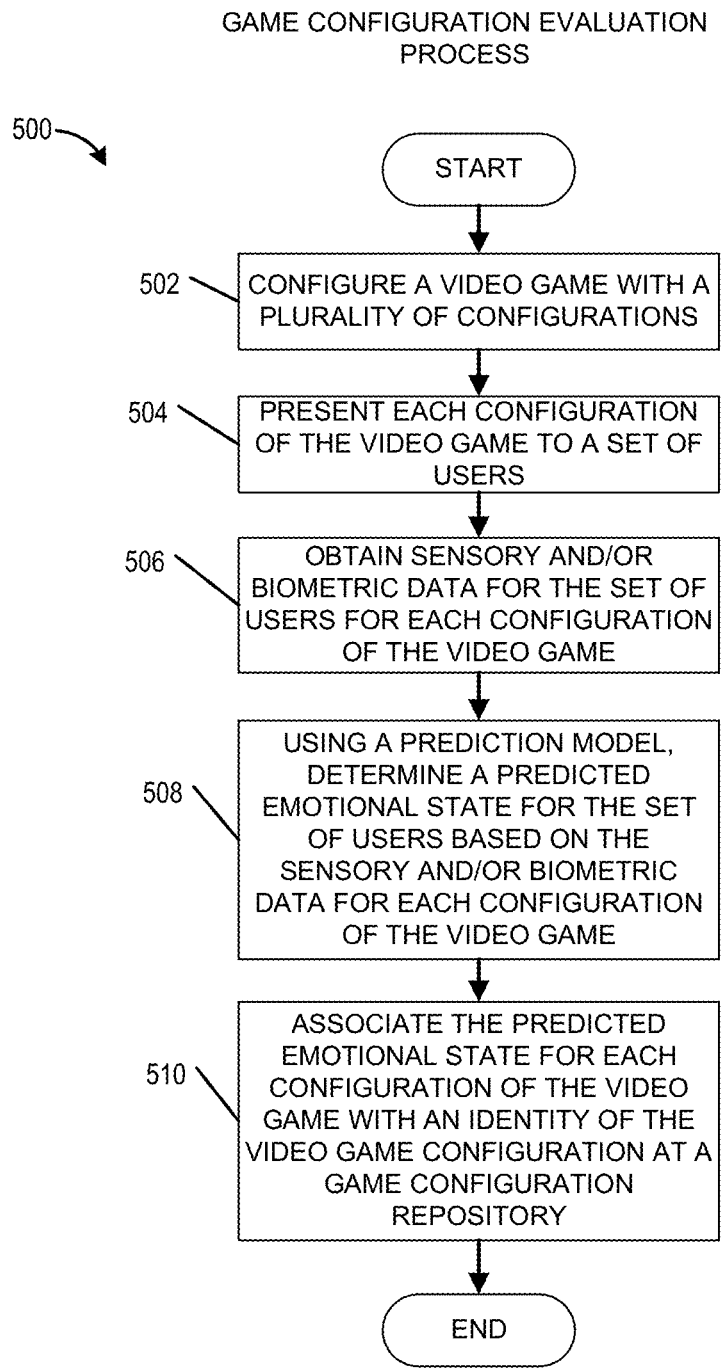
FIG. 5 presents a flowchart of an embodiment of a game-state configuration evaluation process.

FIG. 5 presents a flowchart of an embodiment of a game-state configuration evaluation process 500. The process 500 can be implemented by any system that can perform a test of a video game state to determine the emotional state generated in users who play the video game 112 with the particular video game state. Advantageously, embodiments of the process 500 can be used to test different configurations of the video game 112 to determine the configuration that is most likely to please or satisfy the greatest number of players. The process 500, in whole or in part, can be implemented by, for example, an interactive computing system 130, an emotion capture and determination system 118, a game configuration system 134, a game test engine 136, a model generation system 146, a retention analysis system 140, or a user computing system 110, among others. Although any number of systems, in whole or in part, can implement the process 500, to simplify discussion, the process 500 will be described with respect to particular systems.

The process 500 begins at block 502 where the game test engine 136 configures a video game 112 with a plurality of configurations. In certain embodiments, the game test engine 136 configures a plurality of instances of the video game 112 with at least some instances of the video game 112 associated with a different configuration or state than at least some other instances of the video game 112. In some embodiments, each of the different configurations of the video game 112 may differ based on a single variable or configuration attribute enabling a fine grain analysis of differences between the configurations of the video game 112. In other embodiments, a large number of changes may be made to each configuration of the video game 112 to perform a more coarse-grained analysis of the changes in emotional state attributable to differences within the configuration of the video game 112. The differences in configuration of the video game 112 may relate to gameplay, atmosphere, difficulty, or any other factor that may affect the emotional state of users playing the video game 112.

At block 504, the game test engine 136 may present, or cause to be presented, each configuration of the video game 112 to a set of users. In certain embodiments, each configuration of the video game is presented to the same set of users over a number of different play sessions. For example, if there are two configurations of the video game 112, during a first play session a user may be presented with the first configuration of the video game and during a second play session the user may be presented with a second configuration of the video game. Alternatively, or in addition, each configuration of the video game 112 may be presented to a different set of users over one or more play sessions. For example, a first set of users may be designated or otherwise selected to play a first version of the video game 112 and a second set of users may be designated or otherwise selected to play a second version of the video game 112.

At block 506, the emotion capture and determination system 118 obtains sensory and or biometric data for the set of users for each configuration of the video game 112. In certain embodiments, the block 506 may include one or more of the embodiments previously described with respect to the blocks 302 and/or 402.

Using a prediction model, the emotion analysis system 126 determines a predicted emotional state for the set of users based on the sensory and or biometric data for each configuration of the video game at the block 508. In certain embodiments, the block 508 may include one or more of the embodiments Beardsley described with respect to the blocks 304 and/or 404.

At block 510, the game test engine 136 associates the predicted emotional state for each configuration of the video game 112 with an identity of the video game configuration at a game configuration repository 144. In certain embodiments, the game test engine 136 stores all tested video game configurations along with an indicator of the type of emotional state it caused in the set of test users and/or the degree of the emotional state it causes in the set of test users. In other embodiments, the game test engine 136 may store only video game configurations that caused positive emotional states among the set of test users. In yet other embodiments, the game test engine 136 may store the video game configuration that causes the most positive emotional state or that causes a positive emotional state that satisfies or exceeds a threshold.

Advantageously, in certain embodiments, by associating different video game configurations with different emotional states in the game configuration repository 144, the video game 112 can be dynamically modified during future play sessions or for other users. Moreover, in certain embodiments, the amount of processing required in real time or while a user is playing a particular video game session may be reduced because the determination of different video game state configurations may be determined in advance.

Further, certain embodiments disclosed herein may provide a unique dynamically configurable user interface. For instance, the user interface of the video game 112 may be dynamically modified during different gameplay sessions based on the particular predicted emotional state of a particular user playing the video game 112. This user interface may include the playable user interface with which the user interacts when playing the video game.

In certain embodiments, the process 500 may be used to identify configurations of the video game 112 that are undesirable. For example, if a particular configuration of the video game is determined to cause a negative emotional state for more than a threshold number of users, a developer may determine not to use the particular configuration of the video game 112. Accordingly, certain embodiments disclosed herein may be used to facilitate testing of the video game 112 among a set of users, such as test users or beta users. Further, in certain embodiments, the particular configuration of the video game associated with the negative emotional state may be omitted from the game configuration repository 144. Alternatively, certain embodiments, the particular configuration of the video game 112 associated with the negative emotional state may be stored at the game configuration repository 144 with an indicator that causes the game configuration system 134 to not use the particular configuration of the video game when determining how to modify a configuration of the video game 112.

In certain embodiments, one or more of the processes 300, 400, or 500 may be used to determine whether modifications to the video game 112 cause an emotional state or predicted emotional state of the user to move in a particular direction. Based on the particular direction of the change in emotional state or predicted emotional state, the game configuration system 134 may determine whether to make additional changes to the video game 112. These additional changes to the video game 112 may be selected to further change the emotional state in the same direction or to attempt to reverse the particular direction of the change in emotional state or predicted emotional state. For example, if it is determined that the change in the configuration the video game 112 makes a user feel a more positive emotion, no further changes may be made to the video game 112, similar changes may be made to additional portions of the video game 112, or a degree of the changes made to the video game 112 may be increased. In contrast, if it is determined that the change in the configuration of the video game 112 makes a user file more negative emotion, the change the video game 112 may be reversed or different changes may be made to additional portions of the video game 112.

Overview of Computing System

Figure 6:
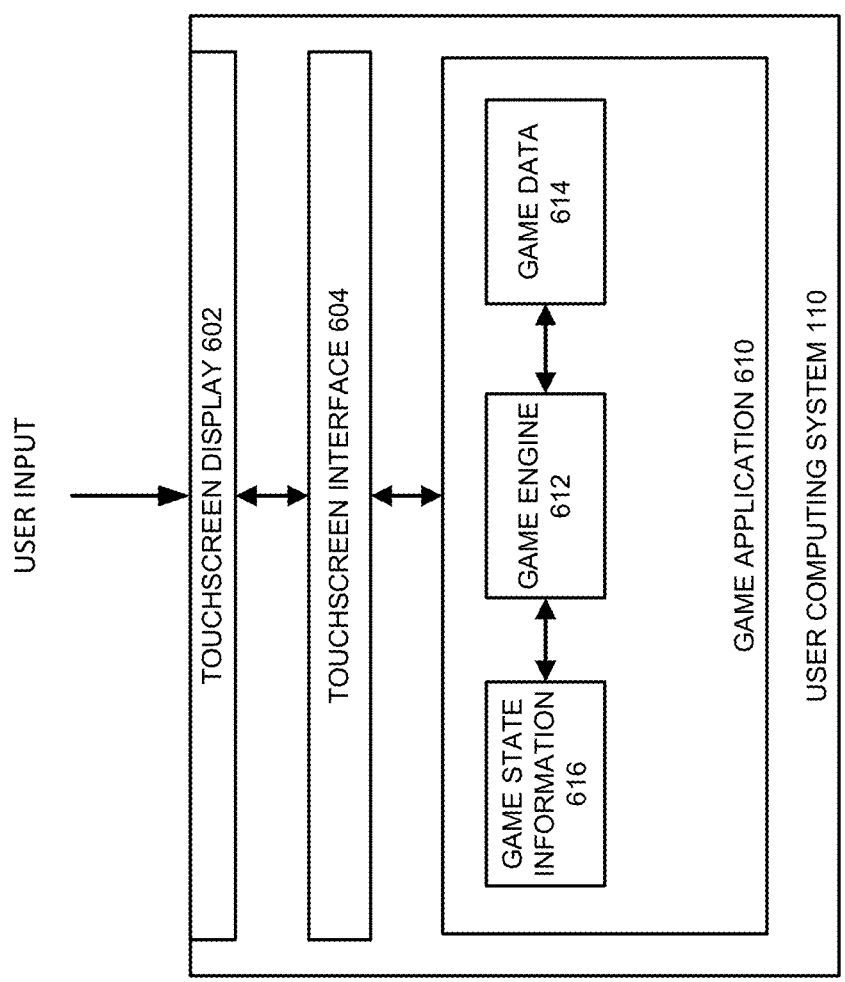
FIG. 6 illustrates an embodiment of a user computing system.

FIG. 6 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 6, the user computing system 110 is a touch-capable computing device capable of receiving input from a user via a touchscreen display 602. However, the user computing system 110 is not limited as such and may include non-touch capable embodiments, which do not include a touchscreen display 602.

The user computing system 110 includes a touchscreen display 602 and a touchscreen interface 604, and is configured to execute a game application 610. This game application may be the video game 112 or an application that executes in conjunction with or in support of the video game 112, such as a video game execution environment. Although described as a game application 610, in some embodiments the application 610 may be another type of application that may have a variable execution state based at least in part on the preferences or capabilities of a user, such as educational software. While user computing system 110 includes the touchscreen display 602, it is recognized that a variety of input devices may be used in addition to or in place of the touchscreen display 602.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing game applications 610. For example, the user computing system 110 may be a video game console. The game applications 610 executed by the user computing system 110 may be created using a particular application programming interface (API) or compiled into a particular instruction set that may be specific to the user computing system 110. In some embodiments, the user computing system 110 may be a general purpose computing device capable of executing game applications 610 and non-game applications. For example, the user computing system 110 may be a laptop with an integrated touchscreen display or desktop computer with an external touchscreen display. Components of an example embodiment of a user computing system 110 are described in more detail with respect to FIG. 7.

The touchscreen display 602 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 602. The touchscreen interface 604 can be configured to translate the touch input into data and output the data such that it can be interpreted by components of the user computing system 110, such as an operating system and the game application 610. The touchscreen interface 604 can translate characteristics of the tactile touch input touch into touch input data. Some example characteristics of a touch input can include, shape, size, pressure, location, direction, momentum, duration, and/or other characteristics. The touchscreen interface 604 can be configured to determine the type of touch input, such as, for example a tap (for example, touch and release at a single location) or a swipe (for example, movement through a plurality of locations on touchscreen in a single touch input). The touchscreen interface 604 can be configured to detect and output touch input data associated with multiple touch inputs occurring simultaneously or substantially in parallel. In some cases, the simultaneous touch inputs may include instances where a user maintains a first touch on the touchscreen display 602 while subsequently performing a second touch on the touchscreen display 602. The touchscreen interface 604 can be configured to detect movement of the touch inputs. The touch input data can be transmitted to components of the user computing system 110 for processing. For example, the touch input data can be transmitted directly to the game application 610 for processing.

In some embodiments, the touch input data can undergo processing and/or filtering by the touchscreen interface 604, an operating system, or other components prior to being output to the game application 610. As one example, raw touch input data can be captured from a touch input. The raw data can be filtered to remove background noise, pressure values associated with the input can be measured, and location coordinates associated with the touch input can be calculated. The type of touch input data provided to the game application 610 can be dependent upon the specific implementation of the touchscreen interface 604 and the particular API associated with the touchscreen interface 604.

In some embodiments, the touch input data can include location coordinates of the touch input. The touch signal data can be output at a defined frequency. Processing the touch inputs can be computed many times per second and the touch input data can be output to the game application for further processing.

A game application 610 can be configured to be executed on the user computing system 110. The game application 610 may also be referred to as a video game, a game, game code and/or a game program. A game application should be understood to include software code that a user computing system 110 can use to provide a game for a user to play. A game application 610 might comprise software code that informs a user computing system 110 of processor instructions to execute, but might also include data used in the playing of the game, such as data relating to constants, images and other data structures. For example, in the illustrated embodiment, the game application includes a game engine 612, game data 614, and game state information 616.

The touchscreen interface 604 or another component of the user computing system 110, such as the operating system, can provide user input, such as touch inputs, to the game application 610. In some embodiments, the user computing system 110 may include alternative or additional user input devices, such as a mouse, a keyboard, a camera, a game controller, and the like. A user can interact with the game application 610 via the touchscreen interface 604 and/or one or more of the alternative or additional user input devices. The game engine 612 can be configured to execute aspects of the operation of the game application 610 within the user computing system 110. Execution of aspects of gameplay within a game application can be based, at least in part, on the user input received, the game data 614, and game state information 616. The game data 614 can include game rules, prerecorded motion capture poses/paths, environmental settings, constraints, animation reference curves, skeleton models, and/or other game application information. Further, the game data 614 may include information that is used to set or adjust the difficulty of the game application 610.

The game engine 612 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 610, the game application 610 can store game state information 616, which can include character states, environment states, scene object storage, and/or other information associated with a state of execution of the game application 610. For example, the game state information 616 can identify the state of the game application at a specific point in time, such as a character position, character action, game level attributes, and other information contributing to a state of the game application.

The game engine 612 can receive the user inputs and determine in-game events, such as actions, collisions, runs, throws, attacks and other events appropriate for the game application 610. During operation, the game engine 612 can read in game data 614 and game state information 616 in order to determine the appropriate in-game events. In one example, after the game engine 612 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

FIG. 7 illustrates an embodiment of a hardware configuration for the user computing system 110 of FIG. 6. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 7) as described with respect to FIG. 6, the user computing system 110 may optionally include a touchscreen display 602 and a touchscreen interface 604.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 600. Processing unit 20 can communicate through I/O 32 to store data, such as game state data and any shared data files. In addition to storage 40 and removable storage media 44, computing device 600 is also shown including ROM (Read-Only Memory) 46 and RAM 48.

RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 600 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the computing device 600.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   as implemented by an interactive computing system configured with specific computer-executable instructions,
      receiving, from a user device, a set of sensory data corresponding to a user playing a video game;
      using a first prediction model, determining a predicted emotional state of the user based at least in part on the set of sensory data;
      determining a predicted churn rate of the user by at least applying the predicted emotional state of the user to a second prediction model;
      based at least in part on the predicted emotional state of the user and the predicted churn rate of the user, determining a first modification to a state of the video game; and
      modifying the state of the video game based at least in part on the determined first modification to the state of the video game.

2. The computer-implemented method of claim 1, wherein the set of sensory data comprises one or more types of sensory data.

3. The computer-implemented method of claim 1, wherein the set of sensory data comprises biometric data.

4. The computer-implemented method of claim 1, wherein the set of sensory data comprises at least one of audio data; visual data; heart rate data; respiratory rate data; or galvanic skin response data.

5. The computer-implemented method of claim 1, further comprising:
   receiving a set of signals corresponding to one or more sensors; and
   converting the set of signals to obtain the set of sensory data.

6. The computer-implemented method of claim 1, wherein determining the predicted emotional state comprises:
   providing the set of sensory data to a parameter function, the parameter function generated based at least in part on a machine learning algorithm; and
   determining the predicted emotional state based at least in part on an output of the parameter function.

7. The computer-implemented method of claim 6, further comprising generating the parameter function by at least:
   accessing a second set of sensory data, the second set of sensory data associated with a plurality of users who play the video game and corresponding to one or more emotional states; and
   using the machine learning algorithm to determine the parameter function based at least in part on the second set of sensory data and the corresponding one or more emotional states.

8. The computer-implemented method of claim 1, wherein the sensory data includes audio data comprising speech and the method further comprises:
   converting the speech to text;
   determining a tone of the speech; and
   performing a semantic analysis of the speech, wherein determining the predicted emotional state for the user comprises providing the tone of the speech and a result of the semantic analysis of the speech to the first prediction model.

9. The computer-implemented method of claim 1, wherein the sensory data comprises a plurality of types of sensory data, and wherein the first prediction model weights at least one type of sensory data differently than at least one other type of sensory data.

10. The computer-implemented method of claim 1, wherein determining the first modification to the state of the video game comprises:
    determining a plurality of potential video game state modifications, each potential video game state modification associated with changing an emotional state of the user from a first emotional state to a second emotional state;
    determining a desired emotional state for the user; and
    selecting, from the plurality of potential video game state modifications, the first modification to the state of the video game that is associated with changing the emotional state of the user from the predicted emotional state to the desired emotional state.

11. The computer-implemented method of claim 1, wherein, subsequent to modifying the state of the video game, the method further comprises:
    receiving, from the user device, a second set of sensory data corresponding to the user playing the video game;
    using the first prediction model, determining a second predicted emotional state of the user based at least in part on the second set of sensory data;

based at least in part on the second predicted emotional state of the user, determining a second modification to the state of the video game; and modifying the state of the video game based at least in part on the determined second modification to the state of the video game.

12. The computer-implemented method of claim 11, wherein the second modification to the state of the video game reverts the state of the video game to a previous state of the video game when it is determined that the second predicted emotional state of the user is further from a desired emotional state than the predicted emotional state for the user.

13. The computer-implemented method of claim 11, wherein the second modification to the state of the video game is associated with a contrary modification to the state of the video game than the first modification of the state of the video game.

14. The method of claim 1, wherein said determining the first modification to the state of the video game comprises determining a modified seed value for a portion of the video game, the modified seed value differing from an existing seed value for the portion of the video game, and wherein said modifying the state of the video game comprises replacing the existing seed value with the modified seed value.

15. A system comprising:
an electronic data store configured to store sensory data with respect to a video game; and
a hardware processor in communication with the electronic data store, the hardware processor configured to execute specific computer-executable instructions to at least:
receive, from a user device, a set of sensory data corresponding to a user playing the video game;
use a first prediction model to determine a predicted emotional state of the user based at least in part on the set of sensory data;
determine a predicted churn rate of the user by at least applying the predicted emotional state of the user to a second prediction model;
based at least in part on the predicted emotional state of the user and the predicted churn rate of the user, determine a first modification to a state of the video game; and
modify the state of the video game based at least in part on the determined first modification to the state of the video game.

16. The system of claim 15, wherein the hardware processor is further configured to determine the first modification to the state of the video game by determining a modified seed value for a portion of the video game, the modified seed value differing from an existing seed value previously determined to be applied to the portion of the video game, and wherein the hardware processor is further configured to modify the state of the video game by replacing the existing seed value with the modified seed value.

17. The system of claim 15, wherein determining the predicted emotional state comprises:
providing the set of sensory data to a parameter function, the parameter function generated based at least in part on a machine learning algorithm; and
determining the predicted emotional state based at least in part on an output of the parameter function.

18. The system of claim 15, wherein the hardware processor is further configured to generate the parameter function by at least:
accessing a second set of sensory data, the second set of sensory data associated with a plurality of users who play the video game and corresponding to one or more emotional states; and
using the machine learning algorithm to determine the parameter function based at least in part on the second set of sensory data and the corresponding one or more emotional states.

19. The system of claim 15, wherein the hardware processor is further configured to determine the first modification to the state of the video game by at least:
determining a plurality of potential video game state modifications, each potential video game state modification associated with changing an emotional state of the user from a first emotional state to a second emotional state;
determining a desired emotional state for the user; and
selecting, from the plurality of potential video game state modifications, the first modification to the state of the video game that is associated with changing the emotional state of the user from the predicted emotional state to the desired emotional state.

20. The system of claim 15, wherein, subsequent to modifying the state of the video game, the hardware processor is further configured to at least:
receive, from the user device, a second set of sensory data corresponding to the user playing the video game;
use the first prediction model to determine a second predicted emotional state of the user based at least in part on the second set of sensory data;
based at least in part on the second predicted emotional state of the user, determine a second modification to the state of the video game; and
modify the state of the video game based at least in part on the determined second modification to the state of the video game.

* * * * *